United States Patent
Dai et al.

(10) Patent No.: US 9,819,278 B2
(45) Date of Patent: Nov. 14, 2017

(54) RESONANT CONVERTER CONTROLLED BY EXCITATION CURRENT OF A TRANSFORMER

(71) Applicant: Murata Manufacturing Co., Ltd., Nagaokakyo-shi, Kyoto-fu (JP)

(72) Inventors: Jiale Dai, Shanghai (CN); Yu Cao, Shanghai (CN); Kezhi Wang, Shanghai (CN)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 15/279,836

(22) Filed: Sep. 29, 2016

(65) Prior Publication Data
US 2017/0093287 A1    Mar. 30, 2017

(30) Foreign Application Priority Data
Sep. 30, 2015   (CN) .......................... 2015 1 0639688

(51) Int. Cl.
*H02M 3/335*   (2006.01)
*H02M 3/338*   (2006.01)
*H02M 1/00*    (2006.01)

(52) U.S. Cl.
CPC ....... *H02M 3/338* (2013.01); *H02M 3/33569* (2013.01); *H02M 2001/0058* (2013.01); *Y02B 70/1491* (2013.01)

(58) Field of Classification Search
CPC ...... H02M 3/335–3/42; Y02B 70/1433; Y02B 70/1441
See application file for complete search history.

(56) References Cited

U.S. PATENT DOCUMENTS

| | | | | |
|---|---|---|---|---|
| 2014/0321169 A1* | 10/2014 | Mueller | ............ | H02M 3/33515 363/21.02 |
| 2015/0263631 A1* | 9/2015 | Matsuura | .......... | H02M 3/33546 363/21.02 |
| 2015/0288289 A1* | 10/2015 | Qu | .................... | H02M 3/33546 363/17 |

FOREIGN PATENT DOCUMENTS

JP    2014-103708 A    6/2014

* cited by examiner

*Primary Examiner* — Harry Behm
*Assistant Examiner* — Peter Novak
(74) *Attorney, Agent, or Firm* — Keating & Bennett, LLP

(57) ABSTRACT

A DC/DC conversion apparatus includes a DC voltage source, an oscillation circuit, switch elements, a switch controller, and a transformation circuit. An inductor is provided in the oscillation circuit, a transformer is provided in the transformation circuit and a primary side of the transformer is connected in series with the oscillation circuit. Before a direction of a voltage applied to the oscillation circuit is switched from a first direction to a second direction, the switch controller disconnects electrical connection between the oscillation circuit and the DC voltage source and a first resonance loop is defined by a portion of the plurality of switch elements and the oscillation circuit. When a current flowing through the inductor is equal or substantially equal to an excitation current on the primary side of the transformer in the first resonance loop, at least one switch element in the first resonance loop is turned off to define a second resonance loop. After a current in the second resonance loop oscillates for a first period, the electrical connection between the oscillation circuit and the DC voltage source is connected and the direction of the voltage applied to the oscillation circuit is switched to the second direction.

23 Claims, 12 Drawing Sheets

RESONANT CONVERTER CONTROLLED BY EXCITATION CURRENT OF A TRANSFORMER

CROSS REFERENCE TO RELATED APPLICATIONS

This application claims the benefit of priority to Chinese Patent Application No. 201510639688.2 filed on Sep. 30, 2015. The entire contents of this application are hereby incorporated herein by reference.

BACKGROUND OF THE INVENTION

1. Field of the Invention

The present invention relates to a DC/DC conversion apparatus that includes a LLC full-bridge circuit.

2. Description of the Related Art

In the prior art, a switch power supply is one power supply that utilizes a modern power electronic technology to control a ratio of a turn-on time and a turn-off time of a switch and maintain a stable output voltage, in which a DC/DC conversion apparatus, i.e., direct current-direct current conversion circuit, is a voltage transformer that effectively converts a DC input voltage into a fixed DC output voltage. Generally, the DC/DC conversion apparatus is divided into three types: a boost DC/DC transformer, a buck DC/DC transformer, and a boost-buck DC/DC transformer, and three types of control may be utilized according to requirements. Specifically, by utilizing energy storage characteristics of a capacitor and an inductor, high-frequency switching actions are performed by a controllable switch (MOSFET, etc.), inputted electric energy is stored in the capacitor or the inductor, and the electric energy is released to a load so as to provide energy when the switch is turned off. Its ability to output power or a voltage is related to a duty cycle, i.e., a ratio of a turn-on time of the switch and the whole cycle of the switch.

However, as the power electronic technology is developing rapidly, requirements such as more high-frequency operation, high conversion efficiency, high power density, low noise and other requirements have been proposed to a switch power supply.

FIG. 10 shows an existing DC/DC conversion apparatus 100 that includes a LLC full-bridge circuit. As shown in FIG. 10, the DC/DC conversion apparatus 100 includes a direct-current (DC) voltage source V10, four switch elements Q1~Q4, an oscillation circuit 20 including an inductor Lr and a capacitor Cr, and a transformation circuit 40 including a transformer 30 and a rectification circuit. In the DC/DC conversion apparatus 100, turn-on and turn-off of individual switch elements Q1~Q4 are controlled, so as to control energy to be transmitted from a primary side Tr1 of the transformer 30 to its secondary side Tr2.

In the DC/DC conversion apparatus 100 as shown in FIG. 10, a relationship as shown in FIG. 12 exists between a switching frequency fs of the switch elements Q1~Q4 and a gain G of the DC/DC conversion apparatus 100. As shown in FIG. 12, when the switching frequency fs is equal to a resonance frequency fr of the oscillation circuit 20, the gain of the DC/DC conversion apparatus 100 is at a maximum, and when the switching frequency fs is greater than the resonance frequency fr, the gain of the DC/DC conversion apparatus 100 will decrease as the switching frequency fs increases.

Therefore, when an output terminal of the DC/DC conversion apparatus 100 is a light load, in order to avoid the light load from being damaged due to a large current flowing through the light load, the switching frequency fs of the individual switch elements will usually be increased so as to decrease the gain of the DC/DC conversion apparatus 100, such that a current flowing through the light load decreases to prevent it from being damaged.

However, in the above case, as the operating frequency fs of the switch elements increases, various losses related to the operating frequency fs (e.g., a loss of turning off the MOSFET switch each time), a turn-on loss due to skin effect, proximity effect, and other factors, a loss of a magnetic core, and other losses increase rapidly. For example, within one unit time of 1 s, the times of turning on/off the individual switch elements Q1~Q4 will increase, which results in an increased power loss on each switch element, such that a conversion efficiency of a power supply voltage decreases.

In view of this, there is a known method of outputting energy nonconsecutively. Specifically, turn-on and turn-off of the individual switch elements Q1~Q4 are controlled such that energy is transmitted from the primary side Tr1 to the secondary side Tr2 of the transformer 30 nonconsecutively. In other words, as shown in FIG. 11, at time t1-t2, after a current $I_{LLC}$ flowing through the oscillation circuit 20 becomes zero and after a period of time $\Delta t$, a direction of a voltage applied to the oscillation circuit 20 is switched, such that without changing the operating frequency fs of the switch elements Q1~Q4, the gain of the DC/DC conversion apparatus can be reduced to cope with the case of the light load.

However, in the above method, a parasitic inductance Lm on the primary side Tr1 of the transformer 3 connected with the oscillation circuit 20 is larger and a current ILm flowing through the parasitic inductance that cannot be ignored is not considered.

Specifically, FIG. 13 shows a relationship between a current ILr flowing through the inductor Lr and the current ILm flowing through the parasitic inductance Lm, and FIG. 14 shows an output current Iout being obtained based upon the current ILr and the current ILm in FIG. 13. In FIG. 13, a solid line denotes the current ILr flowing through the oscillation circuit 20, in which as the load gets smaller, the current ILr gets smaller, and a dashed line denotes the current ILm flowing through the parasitic inductance Lm, in which the current ILm will not vary with a size of the load. Moreover, as shown in FIG. 13, the current ILr will approach towards the current ILm until finally overlapping along a direction of an arrow A. Corresponding to this, as shown in FIG. 14, when ILr≠ILm, the output current Iout≠0, and when ILr=ILm, the output current Iout=0.

If the direction of the voltage applied to the oscillation circuit 20 is not switched instantly (i.e., to wait for a period of time $\Delta t$ as shown in FIG. 11) when ILr=ILm, as shown in FIG. 13, although the output current Iout is zero and no energy is transmitted from the primary side Tr1 to the secondary side Tr2 of the transformer at this moment, there is still the current ILm (i.e., ILr) that flows in the oscillation circuit 20 and the capacitor Cr will continue to be charged by the current ILm. Thus, if after the switch elements Q2 and Q4 are turned on, the switch elements Q2 and Q4 continue to be turned on until ILr=ILm such that free oscillation is performed (i.e., to continue for a latency $\Delta t$), although no energy is transmitted from the primary side Tr1 to the secondary side Tr2 of the transformer 30 at this moment, there is still the current ILm and a portion of energy is stored in the capacitor Cr. Moreover, when the parasitic inductance Lm on the primary side Tr1 of the transformer 30 is larger such that ILm is larger, this portion of energy will also become larger. In this case, when the switch elements Q2 and Q3 are switched to be turned on and the switch elements Q1 and Q4 are switched to be turned off at time t2, this portion of energy stored in the capacitor Cr will firstly be transmitted to the secondary side Tr2 via the primary side Tr1 of the transformer 30 The result is that a total output energy Eout becomes larger. Although a length of time T of a complete cycle becomes larger due to the addition of a latency Δt, the output energy Pout=Eout/T is related to both Eout and T. Thus, in this case, it cannot be determined whether a total output power Pout will decrease or increase, such that it cannot be determined whether the gain of the DC/DC conversion apparatus 100 will decrease or increase.

Thus, the goal is to decrease the gain in the case of the light load, but it cannot be ensured that the gain will decrease necessarily by the above method for outputting the energy nonconsecutively.

On the other hand, in the DC/DC conversion apparatus that includes a LLC full-bridge circuit, there is also a problem of switching loss (MOSFET, etc.). For the problem of switching loss, a soft-switching technology is usually used in the present technical field.

Soft-switching is in contrast to hard-switching. Generally, resonance is introduced before and after the process of the turn-on and the turn-off, such that a voltage of the switch before it is turned on is firstly reduced to zero and a current of the switch before it is turned off is firstly reduced to zero, which eliminates an overlap of the voltage and the current of the switch during the turn-on and the turn-off and decrease their variation ratios so as to greatly reduce or even eliminate the switching loss. At the same time, the variation ratios of the voltage and the current of the switch during the turn-on and the turn-off are restricted by the resonance process, which also significantly decreases the noise of the switch.

For the process of turning off the switch, an ideal soft turn-off process is such that the current is firstly reduced to zero and then the voltage increases slowly to an off-state value. At this moment, a turn-off loss of the switch is approximately zero. Since the current of the device before it is turned off has been reduced to zero, the problem of inductive turn-off has been solved. This is usually referred to as a zero current switch (ZCS). In addition, for the process of turning on the switch, an ideal soft turn-on process is such that the voltage is firstly reduced to zero and then the current increases slowly to an on-state value. At this moment, a turn-on loss of the switch is approximately zero. Since the voltage of a junction capacitance of the device is also zero, the problem of capacitive turn-on has been solved. This is usually referred to as a zero voltage switch (ZVS).

In the prior art, in order to decrease the loss of the switch when it is turned on or even achieve the zero current switch (ZCS) and/or the zero voltage switch (ZVS), sequences of turning on and off the individual switch elements Q1~Q4 have to be adjusted appropriately.

SUMMARY OF THE INVENTION

Preferred embodiments of the present invention provide a DC/DC conversion apparatus in which a new resonance loop is provided by controlling turn-on and turn-off of switch elements, and a direction of a voltage applied to an oscillation circuit is switched after energy oscillates in the new resonance loop for a specified time, such that the energy is actually able to be outputted intermittently and a gain of the DC/DC conversion apparatus is decreased when a load is light.

Preferred embodiments of the present invention also provide a DC/DC conversion apparatus, in which a specified time in which energy oscillates in the new resonance loop is controlled, such that a parasitic capacitance on a switch that is turned on is able to be charged by a portion of energy in the new resonance loop, a switching loss of the switch when it is turned on is reduced, and, furthermore, a zero voltage switch (ZVS) is achieved.

A DC/DC conversion apparatus according to a preferred embodiment of the present invention includes a DC voltage source that outputs a DC power supply voltage; an oscillation circuit electrically connected to the DC voltage source; a plurality of switch elements; a switch controller, which connects or disconnects electrical connection between the DC voltage source and the oscillation circuit by switching turn-on and turn-off of the plurality of switch elements, and switches a direction of a voltage applied to the oscillation circuit between a first direction and a second direction; and a transformation circuit that outputs a current generated in the oscillation circuit and converts the current into a DC current, an inductor is provided in the oscillation circuit, a transformer is provided in the transformation circuit, and a primary side of the transformer is connected in series with the oscillation circuit. Before a direction of a voltage applied to the oscillation circuit is switched from the first direction to the second direction, the switch controller disconnects electrical connection between the oscillation circuit and the DC voltage source and a first resonance loop is defined by a portion of the plurality of switch elements and the oscillation circuit, when a current flowing through the inductor is equal or substantially equal to an excitation current on the primary side of the transformer in the first resonance loop, at least one switch element in the first resonance loop is turned off, thus defining a second resonance loop, after a current in the second resonance loop oscillates through a first period, the electrical connection between the oscillation circuit and the DC voltage source is connected and the direction of the voltage applied to the oscillation circuit is switched to the second direction.

In a DC/DC conversion apparatus according to a preferred embodiment of the present invention, a resonance frequency of the second resonance loop is set to F2, the first period is set to T1, and the following formula is satisfied: T1=N/F2, wherein N is an integer that is greater than or equal to 1.

In a DC/DC conversion apparatus according to a preferred embodiment of the present invention, a resonance frequency of the second resonance loop is set to F2, the first period is set to T1, and the following formula is satisfied: $N/F2 \le T1 \le (N+\frac{1}{4})/F2$ or $(N+\frac{3}{4})/F2 \le T1 \le (N+1)/F2$, wherein N is an integer that is greater than or equal to 0.

In a DC/DC conversion apparatus according to a preferred embodiment of the present invention, a detector is provided on the primary side of the transformer, the detector being used to detect an excitation current ILm on the primary side of the transformer, in the second resonance loop, within a period of $N/F2 \le T1 \le (N+\frac{1}{4})/F2$ or $(N+\frac{3}{4})/F2 \le T1 \le (N+1)/F2$, a time in which the excitation current ILm being detected is greater than zero and less than or equal to a first threshold is used as the first period T1.

In a DC/DC conversion apparatus according to a preferred embodiment of the present invention, the first threshold refers to a current value that causes a turn-on voltage of a switch element turn on when the direction of the voltage applied to the oscillation circuit is switched to the second direction to be equal or substantially equal to zero.

In a DC/DC conversion apparatus according to a preferred embodiment of the present invention, after the current flowing through the inductor is equal or substantially equal to the excitation current on the primary side of the transformer in the first resonance loop, when the first resonance loop remains invariable and after passing through a third period, the second resonance loop is defined.

According to various preferred embodiments of the present invention, a new resonance loop is provided by controlling turn-on and turn-off of the switch elements, and a direction of a voltage applied to an oscillation circuit is switched after energy oscillates in the new resonance loop for a specified time period, such that the energy can be intermittently outputted and a gain of the DC/DC conversion apparatus is decreased when a load is light.

Further, according to various preferred embodiments of the present invention, a specified time in which energy oscillates in the new resonance loop is controlled, such that a parasitic capacitance on a switch that is turned on can be charged by a portion of energy within the new resonance loop, a switching loss of the switch when it is turned on is reduced, and, furthermore, a zero voltage switch (ZVS) is achieved.

The above and other elements, features, steps, characteristics and advantages of the present invention will become more apparent from the following detailed description of the preferred embodiments with reference to the attached drawings.

BRIEF DESCRIPTION OF THE DRAWINGS

FIGS. 2-1 to 2-3 show diagrams of relationships between times at which various switch elements Q1~Q4 are turned on/off, a current ILr flowing through an inductor Lr, and a voltage between a high potential side terminal Vc+ and a low potential side terminal Vc− of the oscillation circuit 2, wherein FIG. 2-1 shows a first control method, FIG. 2-2 shows a second control method, and FIG. 2-3 shows a third control method.

FIGS. 3A and 3B are diagrams showing a comparison of a curve of currents ILr and ILm in the prior art and a curve of currents ILr and ILm in the first preferred embodiment of the present invention, wherein FIG. 3A is the curve of the currents ILr and ILm in the prior art and FIG. 3B is the curve of the currents ILr and ILm in the first preferred embodiment of the present invention, in which solid lines indicate the current ILr and dashed line indicate the current ILm.

DETAILED DESCRIPTION OF THE PREFERRED EMBODIMENTS

First Preferred Embodiment

A DC/DC conversion apparatus according to a first preferred embodiment of the present invention will be described below with reference to FIG. 1.

Figure 1:
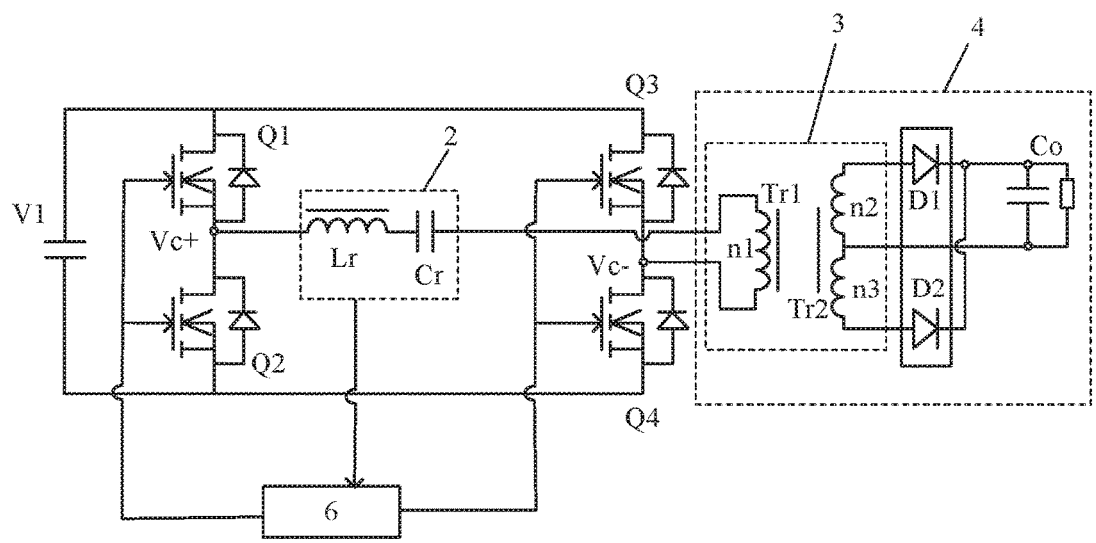
FIG. 1 is a block diagram illustrating a circuit structure of a DC/DC conversion apparatus according to a first preferred embodiment of the present invention.

FIG. 1 is a block diagram illustrating a circuit structure of a DC/DC conversion apparatus according to a first preferred embodiment of the present invention. As shown in FIG. 1, the DC/DC conversion apparatus 10 includes a DC voltage source V1 that outputs a DC power supply voltage Vin; an oscillation circuit 2 electrically connected to the DC voltage source V1; a plurality of switch elements Q1~Q4; a switch controller 6, which connects or disconnects electrical connection between the DC voltage source V1 and the oscillation circuit 2 by switching turn-on and turn-off of the plurality of switch elements Q1~Q4, and switches a direction of a voltage applied to the oscillation circuit 2 between a first direction and a second direction; and a transformation circuit 4 that outputs a current generated in the oscillation circuit 2 and converts the current into a DC current.

Specifically, a positive side of the DC voltage source V1 is connected to drain sides of a switch element Q1 and a switch element Q3, and a negative side of the DC voltage source V1 is connected to source sides of a switch element Q2 and a switch element Q4. In preferred embodiments of the present invention, the DC voltage source V1 is an electronic apparatus that provides a stable DC power supply voltage Vin for a load. For example, the DC voltage source V1 may preferably be a dry battery, a storage battery, a DC generator, or other suitable voltage source, for example.

A transformer 3, rectification diodes D1 and D2, and an output capacitor Co are provided in the transformation circuit 4. The transformer 3 includes a primary side Tr1 and a secondary side Tr2, in which the primary side Tr1 includes a coil n1, the secondary side Tr2 includes a coil n2 and a coil n3, and a parasitic inductance Lm is provided on the primary side Tr1 of the transformer 3. An anode of the rectification diode D1 is connected at one terminal of the coil n2 of the secondary side Tr2 and a cathode of the rectification diode D1 is connected to the other terminal of the coil n2 of the secondary side Tr2 via the output capacitor Co. In addition, an anode of the rectification diode D2 is connected to one terminal of the coil n3 of the secondary side Tr2 and a cathode of the rectification diode D2 is connected to the cathode of the rectification diode D1.

An inductor Lr and a capacitor Cr are provided in the oscillation circuit 2, and a high potential side terminal Vc+ and a low potential side terminal Vc− are provided in the oscillation circuit 2. Moreover, the primary side Tr1 of the transformer 3 is connected in series with the oscillation circuit 2. The high potential side terminal Vc+ is connected with a connection point of the switch element Q1 and the switch element Q2 and the low potential side terminal Vc− is connected with a connection point of the switch element Q3 and the switch element Q4. Moreover, the inductor Lr and the capacitor Cr are connected in series between the high potential side terminal Vc+ and the low potential side terminal Vc− via the primary side Tr1 of the transformer 3.

Connection relationships of the plurality of switch elements Q1~Q4 are shown in FIG. 1. The first switch element Q1 is provided between the positive side of the DC voltage source V1 and the high potential side terminal Vc+ of the oscillation circuit 2, the third switch element Q3 is provided between the positive side of the DC voltage source V1 and the low potential side terminal Vc− of the oscillation circuit 2, the second switch element Q2 is provided between the negative side of the DC voltage source V1 and the high potential side terminal Vc+ of the oscillation circuit 2, and the fourth switch element Q4 is provided between the negative side of the DC voltage source V1 and the low potential side terminal Vc− of the oscillation circuit 2.

In addition, the plurality of switch elements Q1~Q4 may preferably be field-effect transistors that are widely used in an analog circuit and a digital circuit, e.g., a metal oxide semiconductor field-effect transistor (MOSFET). The MOSFET may be divided into two types: "N-type" and "P-type" according to different polarities of its working carriers. In preferred embodiments of the present invention, there are no restrictions on which of the plurality of switch elements Q1~Q4, are an "N-type" MOSFET and which may are a "P-type" MOSFET. Of course, the plurality of switch elements Q1~Q4 may also be other types of switch elements in the present field.

When an excitation current ILm generated on the parasitic inductance Lm of the primary side Tr1 of the transformer 3 is set as ILm and a current generated on the inductor Lr is set as ILr, the switch controller 6 switches turn-on and turn-off of the plurality of switch elements Q1~Q4 according to a relationship between ILm and ILr. Specifically, when the switch element Q1 and the switch element Q4 are turned on and the switch element Q2 and the switch element Q3 are turned off under the control of the switch controller 6, a voltage Vc+− applied to two terminals of the oscillation circuit 2 has the same phase with the DC power supply voltage Vin, i.e., positive voltages will be applied thereon. When the switch element Q2 and the switch element Q3 are turned on and the switch element Q1 and the switch element Q4 are turned off under the control of the switch controller 6, a voltage Vc+− applied to two terminals of the oscillation circuit 2 has a different phase from the DC power supply voltage Vin, i.e., negative voltages will be applied thereon. In addition, when the switch element Q1 and the switch element Q3 are both turned off or when the switch element Q2 and the switch element Q4 are both turned off, the oscillation circuit 2 is not electrically connected to the DC voltage source V1, i.e., no voltage will be applied to the two terminals of the oscillation circuit 2.

Figures 1, 2:
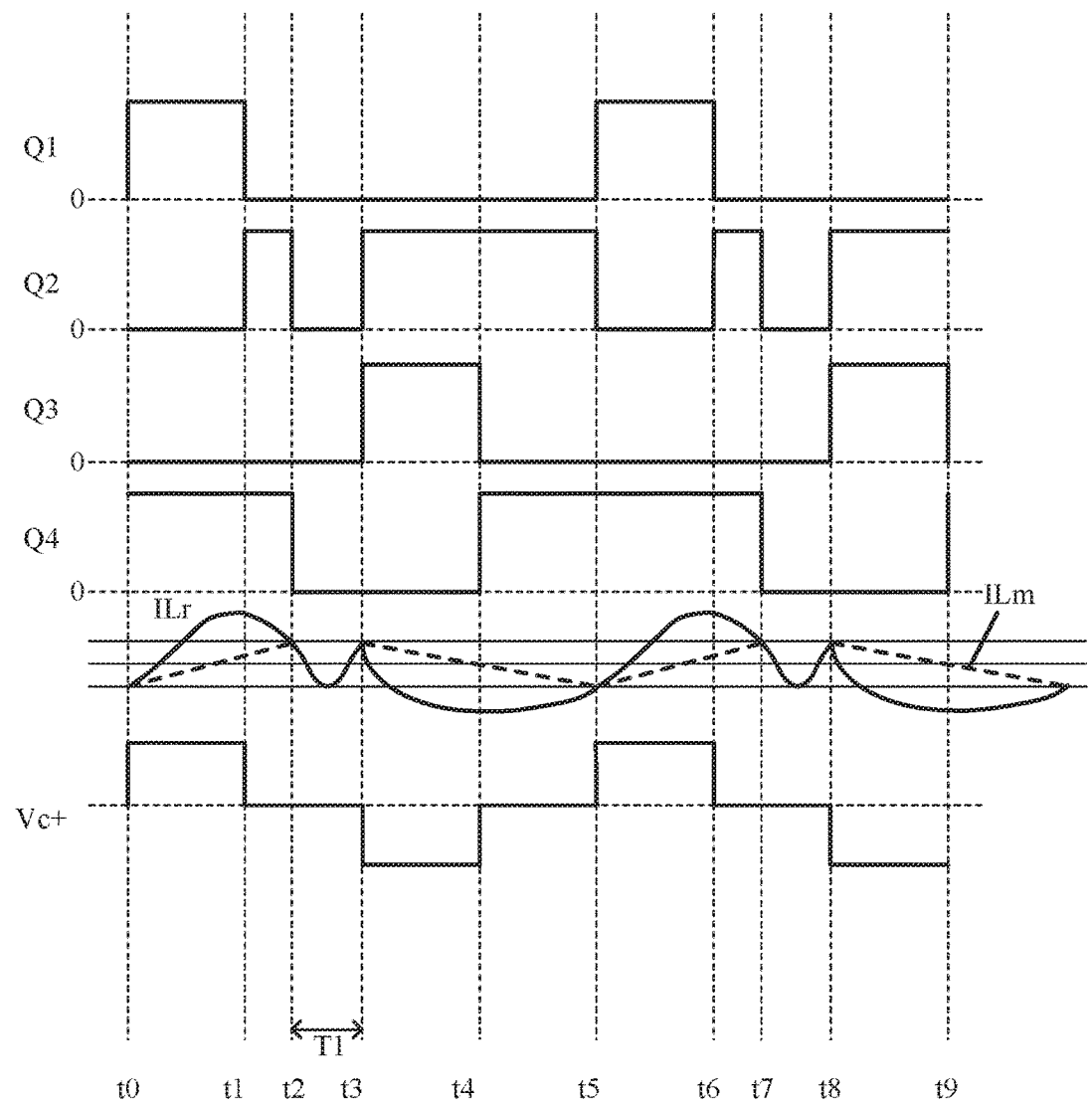
Figure 2:
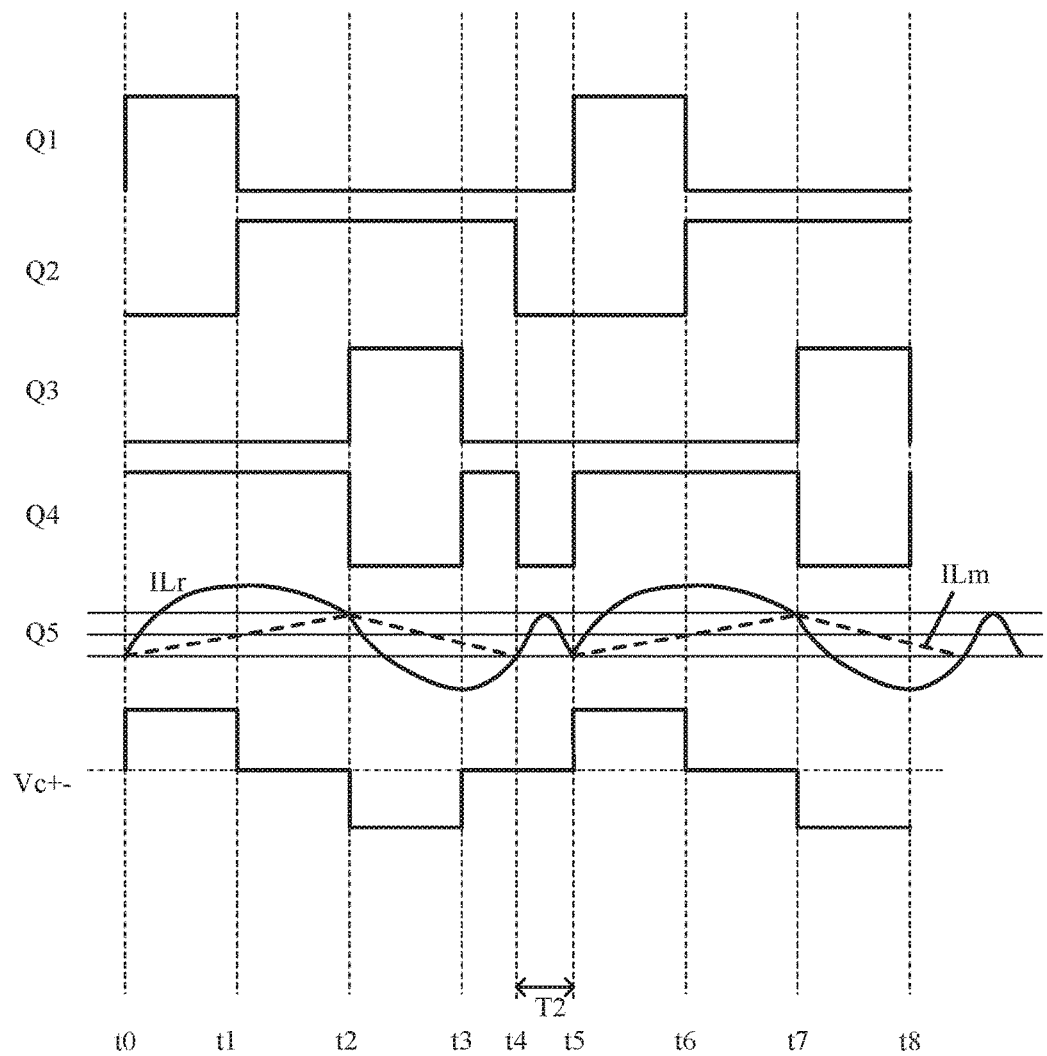
Figures 2, 3:
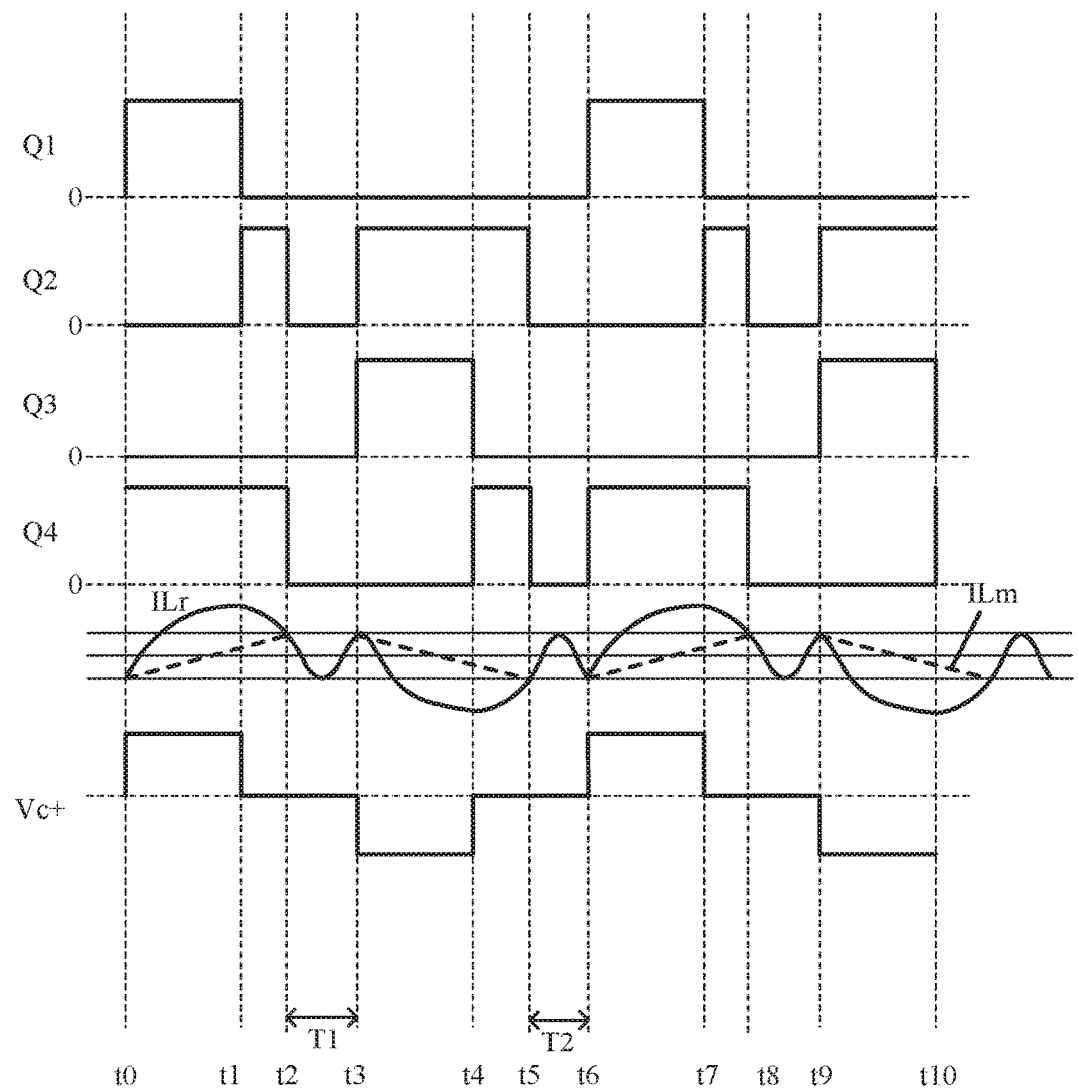

FIGS. 2-1 to 2-3 show diagrams of relationships between times at which various switch elements Q1~Q4 are turned on/off, a current ILr flowing through the inductor Lr, and a voltage between the high potential side terminal Vc+ and the low potential side terminal Vc− of the oscillation circuit 2 in FIG. 1. FIG. 2-1 shows a relationship diagram of a first control method of the switch controller 6, FIG. 2-2 shows a relationship diagram of a second control method of the switch controller 6, and FIG. 2-3 shows a relationship diagram of a third control method of the switch controller 6. Solid lines indicate the current ILr flowing through the inductor Lr and dashed lines indicate the excitation current ILm on the parasitic inductance Lm of the primary side Tr1 of the transformer 3.

A first control method of the switch controller 6 is set forth according to FIG. 2-1. As shown in FIG. 2-1, a period of time t0 to time t5 is one cycle.

At time t0, the switch element Q1 and the switch element Q4 are turned on at the same time and the switch element Q2 and the switch element Q3 are turned off at the same time under the control of the switch controller 6. As such, the electrical connection between the oscillation circuit 2 and the DC voltage source V1 is connected and the voltage Vc+− applied to the oscillation circuit 2 instantly becomes a positive value. At this moment, since a positive voltage Vc+− has been applied to the oscillation circuit 2, the current ILr flowing through the inductor Lr becomes a positive value and increases gradually. Moreover, the excitation current ILm on the parasitic inductance Lm of the primary side Tr1 of the transformer 3 also becomes a positive value and increases gradually.

At time t1, the switch element Q2 and the switch element Q4 are turned on at the same time and the switch element Q1 and the switch element Q3 are turned off at the same time under the control of the switch controller 6. Thus, the electrical connection between the oscillation circuit 2 and the DC voltage source V1 is disconnected, the voltage Vc+− applied to the oscillation circuit 2 instantly becomes zero, but the current ILr flowing through the inductor Lr is still a positive value. At this moment, a first resonance loop LLC1 is defined by the switch element Q2 and the switch element Q4, the inductor Lr, the capacitor Cr, and the primary side Tr1 of the transformer 3, the above current ILr oscillates freely in the first resonance loop LLC1 while the capacitor Cr is charged, and energy continues to be transmitted from the inductor Lr to the primary side Tr1 of the transformer 3 until the current ILr flowing through the inductor Lr is equal or substantially equal to the excitation current ILm on the parasitic inductance Lm of the primary side Tr1 of the transformer 3, such that the energy is transmitted to the secondary side Tr2 through the primary side Tr1 of the transformer 3.

At time t2, the current ILm flowing through the inductor Lr is equal or substantially equal to the excitation current ILm on the parasitic inductance Lm. At this moment, the switch elements Q1~Q4 are turned off at the same time under the control of the switch controller 6. As such, the electrical connection between the oscillation circuit 2 and the DC voltage source V1 is disconnected, the voltage Vc+− applied to the oscillation circuit 2 continues to be zero, and the current ILr flowing through the inductor Lr (i.e., the excitation current ILm on the parasitic inductance Lm) is still a positive value. At this moment, since parasitic capacitances Cm2 and Cm4 exit at two terminals of the switch element Q2 and the switch element Q4 respectively, a second resonance loop LLC2 is defined by the parasitic capacitance Cm2, the parasitic capacitance Cm4, the capacitor Cr, the inductor Lr, and the primary side Tr1 of the transformer 3, the current ILr (i.e., the current ILm) oscillating freely in the second resonance loop LLC2.

At time t3, the current ILr (i.e., the current ILm) oscillates freely in the second resonance circuit LCC2 for a complete resonance cycle. At this moment, the switch element Q2 and the switch element Q3 are turned on at the same time and the switch element Q1 and the switch element Q4 are turned off at the same time under the control of the switch controller 6. As such, the electrical connection between the oscillation circuit 2 and the DC voltage source V1 is connected and the voltage Vc+− applied to the oscillation circuit 2 instantly becomes a negative value. At this moment, since a negative voltage Vc+− has been applied to the oscillation circuit 2, the current ILr flowing through the inductor Lr decreases negatively from the current of ILr=ILm, i.e., becomes a negative value.

As described above, when a resonance frequency of the second resonance loop LLC2 is F2, a length of time of a period of t2-t3 is 1/F2, i.e., a complete resonance cycle. In the period of t2-t3, since the current ILr flowing through the inductor Lr is equal to the excitation current ILm on the parasitic inductance Lm (i.e., ILr=ILm), no energy is transmitted from the primary side Tr1 to the secondary side Tr2 of the transformer 3. Moreover, although the capacitor Cr will be charged by ILr (i.e., ILm), forward charging and reverse charging of the capacitor Cr are cancelled out within the period of t2-t3 because the length of time of the period of t2-t3 is 1/F2. Thus, at time t3, energy on the capacitor Cr is zero such that not only no energy is transmitted from the primary side Tr1 to the secondary side Tr2 of the transformer 3 within the period of t2-t3, but also no energy is transmitted from the primary side Tr1 to the secondary side Tr2 of the transformer 3 at time t3. In other words, intermittent outputting of the energy is actually achieved.

At time t4, the switch element Q2 and the switch element Q4 are turned on at the same time and the switch element Q1 and the switch element Q3 are turned off at the same time under the control of the switch controller 6. Thus, the electrical connection between the oscillation circuit 2 and the DC voltage source V1 is disconnected, the voltage Vc+− applied to the oscillation circuit 2 instantly becomes zero, but the current ILr flowing through the inductor Lr is still a negative value. At this moment, the first resonance loop LLC1 is again defined by the switch element Q2 and the switch element Q4, the inductor Lr, the capacitor Cr, and the primary side Tr1 of the transformer 3, the current ILr oscillates freely in the first resonance loop LLC1 while the capacitor Cr is charged, and energy continues to be transmitted from the inductor Lr to the primary side Tr1 of the transformer 3 until the current ILr flowing through the inductor Lr is equal or substantially equal to the excitation current ILm on the parasitic inductance Lm of the primary side Tr1 of the transformer 3, such that the energy is transmitted to the secondary side Tr2 through the primary side Tr1 of the transformer 3.

At time t5, the current ILr flowing through the inductor Lr is equal or substantially equal to the excitation current ILm on the parasitic inductance Lm. At this moment, the switch element Q1 and the switch element Q4 are turned on at the same time and the switch element Q2 and the switch element Q3 are turned off at the same time under the control of the switch controller 6. As such, the electrical connection between the oscillation circuit 2 and the DC voltage source V1 is connected and the voltage Vc+− applied to the oscillation circuit 2 instantly becomes a positive value. At this moment, since a positive voltage Vc+− has been applied to the oscillation circuit 2, the current ILr flowing through the inductor Lr increases positively from the current of ILr=ILm, i.e., becomes a positive value.

Next, a second control method of the switch controller 6 is set forth according to FIG. 2-2. As shown in FIG. 2-2, a period of time t0 to time t5 is one cycle.

At time t0, the switch element Q1 and the switch element Q4 are turned on at the same time and the switch element Q2 and the switch element Q3 are turned off at the same time under the control of the switch controller 6. As such, the electrical connection between the oscillation circuit 2 and the DC voltage source V1 is connected and the voltage Vc+− applied to the oscillation circuit 2 instantly become a positive value. At this moment, since a positive voltage Vc+− has been applied to the oscillation circuit 2, the current ILr flowing through the inductor Lr becomes a positive value and increases gradually. Moreover, the excitation current ILm on the parasitic inductance Lm of the primary side Tr1 of the transformer 3 also becomes a positive value and increases gradually.

At time t1, the switch element Q2 and the switch element Q4 are turned on at the same time and the switch element Q1 and the switch element Q3 are turned off at the same time under the control of the switch controller 6. Thus, the electrical connection between the oscillation circuit 2 and the DC voltage source V1 is disconnected, the voltage Vc+− applied to the oscillation circuit 2 instantly becomes zero, but the current ILr flowing through the inductor Lr is still a positive value. At this moment, the first resonance loop LLC1 is defined by the switch element Q2 and the switch element Q4, the inductor Lr, the capacitor Cr, and the primary side Tr1 of the transformer 3, the above current ILr oscillates freely in the first resonance loop LLC1 while the capacitor Cr is charged, and energy continues to be transmitted from the inductor Lr to the primary side Tr1 of the transformer 3 until the current ILr flowing through the inductor Lr is equal or substantially equal to the excitation current ILm on the parasitic inductance Lm of the primary side Tr1 of the transformer 3, such that the energy is transmitted to the secondary side Tr2 through the primary side Tr1 of the transformer 3.

At time t2, the current ILr flowing through the inductor Lr is equal or substantially equal to the excitation current ILm on the parasitic inductance Lm. At this moment, the switch element Q2 and the switch element Q3 are turned on at the same time and the switch element Q1 and the switch element Q4 are turned off at the same time under the control of the switch controller 6. As such, the electrical connection between the oscillation circuit 2 and the DC voltage source V1 is connected and the voltage Vc+− applied to the oscillation circuit 2 instantly becomes a negative value. At this moment, since a negative voltage Vc+− has been applied to the oscillation circuit 2, the current ILr flowing through the inductor Lr decreases negatively from the current of ILr=ILm, i.e., becomes a negative value.

At time t3, the switch element Q2 and the switch element Q4 are turned on at the same time and the switch element Q1 and the switch element Q3 are turned off at the same time under the control of the switch controller 6. Thus, the electrical connection between the oscillation circuit 2 and the DC voltage source V1 is disconnected, the voltage Vc+− applied to the oscillation circuit 2 instantly becomes zero, but the current ILr flowing through the inductor Lr is still a negative value. At this moment, the above first resonance loop LLC1 is again defined by the switch element Q2 and the switch element Q4, the inductor Lr, the capacitor Cr, and the primary side Tr1 of the transformer 3, the current ILr oscillates freely in the first resonance loop LLC1 while the capacitor Cr is charged, and energy continues to be transmitted from the inductor Lr to the primary side Tr1 of the transformer 3 until the current ILr flowing through the inductor Lr is equal to the excitation current ILm on the parasitic inductance Lm of the primary side Tr1 of the transformer 3, such that the energy is transmitted to the secondary side Tr2 through the primary side Tr1 of the transformer 3.

At time t4, the current ILm flowing through the inductor Lr is equal to the excitation current ILm on the parasitic inductance Lm. At this moment, the switch elements Q1~Q4 are turned off at the same time under the control of the switch controller 6. As such, the electrical connection between the oscillation circuit 2 and the DC voltage source V1 is disconnected, the voltage Vc+− applied to the oscillation circuit 2 continues to be zero, and the current ILr flowing through the inductor Lr (i.e., the excitation current ILm on the parasitic inductance Lm) is still a negative value. At this moment, since the parasitic capacitances Cm2 and Cm4 exit at two terminals of the switch element Q2 and the switch element Q4 respectively, a third resonance loop LLC3 is defined by the parasitic capacitance Cm2, the parasitic capacitance Cm4, the capacitor Cr, the inductor Lr and the primary side Tr1 of the transformer 3, the above current ILr (i.e., the current ILm) oscillating freely in the third resonance loop LLC3.

At time t5, the above current ILr (i.e., the current ILm) oscillates freely in the third resonance circuit LCC3 for a complete resonance cycle. At this moment, the switch element Q1 and the switch element Q4 are turned on at the same time and the switch element Q2 and the switch element Q3 are turned off at the same time under the control of the switch controller 6. As such, the electrical connection between the oscillation circuit 2 and the DC voltage source V1 is connected and the voltage Vc+− applied to the oscillation circuit 2 instantly becomes a positive value. At this moment, since a positive voltage Vc+− has been applied to the oscillation circuit 2, the current ILr flowing through the inductor Lr increases positively from the current of ILr=ILm, i.e., becomes a positive value.

As described above, when a resonance frequency of the third resonance loop LLC3 is F3, a length of time of a period of t4-t5 is 1/F3, i.e., a complete resonance cycle. In the period of t4-t5, since the current ILr flowing through the inductor Lr is equal or substantially equal to the excitation current ILm on the parasitic inductance Lm (i.e., ILr=ILm), no energy is transmitted from the primary side Tr1 to the secondary side Tr2 of the transformer 3. Moreover, although the capacitor Cr will be charged by ILr (i.e., ILm), forward charging and reverse charging of the capacitor Cr are be cancelled out within the period of t4-t5 because the length of time of the period of t4-t5 is 1/F3. Thus, at time t5, the energy on the capacitor Cr is zero such that not only no energy is transmitted from the primary side Tr1 to the secondary side Tr2 of the transformer 3 within the period of t4-t5, but also no energy is transmitted from the primary side Tr1 to the secondary side Tr2 of the transformer 3 at time t5. In other words, intermittent outputting of the energy is actually realized.

Finally, a third control method of the switch controller 6 is set forth according to FIG. 2-3. As shown in FIG. 2-3, time t0 to time t6 is one cycle.

At time t0, the switch element Q1 and the switch element Q4 are turned on at the same time and the switch element Q2 and the switch element Q3 are turned off at the same time under the control of the switch controller 6. As such, the electrical connection between the oscillation circuit 2 and the DC voltage source V1 is connected and the voltage Vc+− applied to the oscillation circuit 2 instantly become a positive value. At this moment, since a positive voltage Vc+− has been applied to the oscillation circuit 2, the current ILr flowing through the inductor Lr becomes a positive value and increases gradually. Moreover, the excitation current ILm on the parasitic inductance Lm of the primary side Tr1 of the transformer 3 also becomes a positive value and increases gradually.

At time t1, the switch element Q2 and the switch element Q4 are turned on at the same time and the switch element Q1 and the switch element Q3 are turned off at the same time under the control of the switch controller 6. Thus, the electrical connection between the oscillation circuit 2 and the DC voltage source V1 is disconnected, the voltage Vc+− applied to the oscillation circuit 2 instantly becomes zero, but the current ILr flowing through the inductor Lr is still a positive value. At this moment, the first resonance loop LLC1 is defined by the switch element Q2 and the switch element Q4, the inductor Lr, the capacitor Cr, and the primary side Tr1 of the transformer 3, the current ILr oscillates freely in the first resonance loop LLC1 while the capacitor Cr is charged, and energy continues to be transmitted from the inductor Lr to the primary side Tr1 of the transformer 3 until the current ILr flowing through the inductor Lr is equal or substantially equal to the excitation current ILm on the parasitic inductance Lm of the primary side Tr1 of the transformer 3, such that the energy is transmitted to the secondary side Tr2 through the primary side Tr1 of the transformer 3.

At time t2, the current ILm flowing through the inductor Lr is equal or substantially equal to the excitation current ILm on the parasitic inductance Lm. At this moment, the switch elements Q1~Q4 are turned off at the same time under the control of the switch controller 6. As such, the electrical connection between the oscillation circuit 2 and the DC voltage source V1 is disconnected, the voltage Vc+− applied to the oscillation circuit 2 continues to be zero, and the current ILr flowing through the inductor Lr (i.e., the excitation current ILm on the parasitic inductance Lm) is still a positive value. At this moment, since the parasitic capacitances Cm2 and Cm4 exit at two terminals of the switch element Q2 and the switch element Q4 respectively, the second resonance loop LLC2 is defined by the parasitic capacitance Cm2, the parasitic capacitance Cm4, the capacitor Cr, the inductor Lr, and the primary side Tr1 of the transformer 3, the current ILr (i.e., the current ILm) oscillating freely in the second resonance loop LLC2.

At time t3, the above current ILr (i.e., the current ILm) oscillates freely in the second resonance circuit LCC2 for a complete resonance cycle. At this moment, the switch element Q2 and the switch element Q3 are turned on at the same time and the switch element Q1 and the switch element Q4 are turned off at the same time under the control of the switch controller 6. As such, the electrical connection between the oscillation circuit 2 and the DC voltage source V1 is connected and the voltage Vc+− applied to the oscillation circuit 2 instantly becomes a negative value. At this moment, since a negative voltage Vc+− has been applied to the oscillation circuit 2, the current ILr flowing through the inductor Lr decreases negatively from the current of ILr=ILm, i.e., becomes a negative value.

As described above, when the resonance frequency of the second resonance loop LLC2 is F2, the length of time in the period of t2-t3 is 1/F2, i.e., a complete resonance cycle. In the period of t2-t3, since the current ILr flowing through the inductor Lr is equal or substantially equal to the excitation current ILm on the parasitic inductance Lm (i.e., ILr=ILm), no energy is transmitted from the primary side Tr1 to the secondary side Tr2 of the transformer 3. Moreover, although the capacitor Cr will be charged by ILr (i.e., ILm), forward charging and reverse charging of the capacitor Cr are cancelled out within the period of t2-t3 because the length of time of t2-t3 is 1/F2. Thus, at time t3, the energy on the capacitor Cr is zero such that not only no energy is transmitted from the primary side Tr1 to the secondary side Tr2 of the transformer 3 within the period of t2-t3, but also no energy is transmitted from the primary side Tr1 to the secondary side Tr2 of the transformer 3 at time t3. In other words, intermittent outputting of the energy is actually achieved.

At time t4, the switch element Q2 and the switch element Q4 are turned on at the same time and the switch element Q1 and the switch element Q3 are turned off at the same time under the control of the switch controller 6. Thus, the electrical connection between the oscillation circuit 2 and the DC voltage source V1 is disconnected, the voltage Vc+- applied to the oscillation circuit 2 instantly becomes zero, but the current ILr flowing through the inductor Lr is still a negative value. At this moment, the first resonance loop LLC1 is again defined by the switch element Q2 and the switch element Q4, the inductor Lr, the capacitor Cr, and the primary side Tr1 of the transformer 3, the current ILr oscillates freely in the first resonance loop LLC1 while the capacitor Cr is charged, and energy continues to be transmitted from the inductor Lr to the primary side Tr1 of the transformer 3 until the current ILr flowing through the inductor Lr is equal or substantially equal to the excitation current ILm on the parasitic inductance Lm of the primary side Tr1 of the transformer 3, such that the energy is transmitted to the secondary side Tr2 through the primary side Tr1 of the transformer 3.

At time t5, the current ILm flowing through the inductor Lr is equal or substantially equal to the excitation current ILm on the parasitic inductance Lm. At this moment, the switch elements Q1~Q4 are turned off at the same time under the control of the switch controller 6. As such, the electrical connection between the oscillation circuit 2 and the DC voltage source V1 is disconnected, the voltage Vc+- applied to the oscillation circuit 2 continues to be zero, and the current ILr flowing through the inductor Lr (i.e., the excitation current ILm on the parasitic inductance Lm) is still a negative value. At this moment, since the parasitic capacitances Cm2 and Cm4 exit at two terminals of the switch element Q2 and the switch element Q4 respectively, the third resonance loop LLC3 is defined by the parasitic capacitance Cm2, the parasitic capacitance Cm4, the capacitor Cr, the inductor Lr, and the primary side Tr1 of the transformer 3, the current ILr (i.e., the current ILm) oscillating freely in the third resonance loop LLC3.

At time t6, the current ILr (i.e., the current ILm) oscillates freely in the third resonance circuit LCC3 for a complete resonance cycle. At this moment, the switch element Q1 and the switch element Q4 are turned on at the same time and the switch element Q2 and the switch element Q3 are turned off at the same time under the control of the switch controller 6. As such, the electrical connection between the oscillation circuit 2 and the DC voltage source V1 is connected and the voltage Vc+- applied to the oscillation circuit 2 instantly becomes a positive value. At this moment, since a positive voltage Vc+- has been applied to the oscillation circuit 2, the current ILr flowing through the inductor Lr increases positively from the current of ILr=ILm, i.e., becomes a positive value.

As described above, when the resonance frequency of the third resonance loop LLC3 is F3, a length of time in a period of t5-t6 is 1/F3, i.e., a complete resonance cycle. In the period of t5-t6, since the current ILr flowing through the inductor Lr is equal or substantially equal to the excitation current ILm on the parasitic inductance Lm (i.e., ILr=ILm), no energy is transmitted from the primary side Tr1 to the secondary side Tr2 of the transformer 3. Moreover, although the capacitor Cr will be charged by ILr (i.e., ILm), forward charging and reverse charging of the capacitor Cr are cancelled out within the period of t5-t6 because the length of time of t5-t6 is 1/F3. Thus, at time t6, the energy on the capacitor Cr is zero such that not only no energy is transmitted from the primary side Tr1 to the secondary side Tr2 of the transformer 3 within the period of t5-t6, but also no energy is transmitted from the primary side Tr1 to the secondary side Tr2 of the transformer 3 at time t6. In other words, intermittent outputting of the energy is actually achieved.

In addition, for the individual switch elements Q1~Q4, those skilled in the art should know that, in fact, they cannot be turned on or off at exactly the same time due to a dead zone, i.e., there is a time difference between the turn-off and the turn-on. Although the dead zone is not described in the present specification and the switch elements Q1~Q4 are described to be turned on or off at the same time, it does not mean that there is no "dead zone".

Again, the second resonance loop is provided in the period of t2-t3 in FIG. 2-1 and FIG. 2-3, and the third resonance loop is provided in the period of t4-t5 in FIGS. 2-2 and t5-t6 in FIG. 2-3. Strictly speaking, Vc+- is not zero and still has some fluctuation at this moment. However, for simplicity in the present application, Vc+- is shown as zero in the drawings. However, those skilled in the art understand that, in fact, Vc+- is not strictly zero.

In addition, as described above, in the period of t2-t3 in FIG. 2-1 and FIG. 2-3, the current ILr flowing through the inductor Lr (i.e., ILm) oscillates in the second resonance loop LLC2 for a complete resonance cycle. Moreover, in the period of t4-t5 in FIGS. 2-2 and t5-t6 in FIG. 2-3, the current ILr flowing through the inductor Lr (i.e., ILm) also oscillates in the third resonance loop LLC3 for a complete resonance cycle. However, the present invention is not limited thereto. In the period of t2-t3 in FIG. 2-1 and FIG. 2-3, the current ILr (i.e., ILm) also oscillates in the second resonance loop LLC2 for integer times of the resonance cycle. Likewise, in the period of t4-t5 in FIG. 2-1 and t5-t6 in FIG. 2-3, the current ILr flowing through the inductor Lr (i.e., ILm) also oscillates in the third resonance loop LLC3 for integer times of the resonance cycle.

In summary, in the DC/DC conversion apparatus 10 according to the first preferred embodiment of the present invention, if the length of time of the period of t2-t3 in FIG. 2-1 and FIG. 2-3 is set as the first period T1, the length of time of the period of t4-t5 in FIG. 2-2 and the period of t5-t6 in FIG. 2-3 are set as the second period T2, the resonance frequency of the second resonance loop LLC2 is F2, and the resonance frequency of the third resonance loop LLC3 is F3, the first period T1 satisfies the following formula 1 and the second period T2 satisfies the following formula 2.

$$T1 = M/F2, (M \geq 1, \text{ and } M \text{ is an integer});\quad\quad\text{Formula 1:}$$

$$T2 = M/F3, (M \geq 1, \text{ and } M \text{ is an integer}).\quad\quad\text{Formula 2:}$$

As described above, according to the DC/DC conversion apparatus 10 of the first preferred embodiment, as shown in FIG. 2-1, FIG. 2-2 and FIG. 2-3, the switch element Q2 and the switch element Q4 are turned on and the switch element Q1 and the switch element Q3 are turned off, such that the above first resonance loop LLC1 is defined by the switch element Q2, the switch element Q4, the capacitor Cr, the inductor Lr, and the primary side Tr1 of the transformer 3.

Moreover, in the period of t2-t3 in FIG. 2-1 and FIG. 2-3, when ILr=ILm, the switch elements Q1~Q4 are turned off at the same time under the control of the switch controller 6, such that the second resonance loop LLC2 is defined by the parasitic capacitance Cm2 of the switch element Q2, the parasitic capacitance Cm4 of the switch element Q4, the capacitor Cr, the inductor Lr, and the primary side Tr1 of the transformer 3. However, only the switch elements Q1, Q3 and Q4 may be turned off and the switch element Q2 may be turned on, such that the second resonance loop LLC2 is defined by the switch element Q2, the parasitic capacitance Cm4 of the switch element Q4, the capacitor Cr, the inductor Lr, and the primary side Tr1 of the transformer 3. Also, only the switch elements Q1, Q2 and Q3 may be turned off and the switch element Q4 may be turned on, such that the second resonance loop LLC2 is defined by the parasitic capacitance Cm2 of the switch element Q2, the switch element Q4, the capacitor Cr, the inductor Lr, and the primary side Tr1 of the transformer 3.

Likewise, in the period of t4-t5 in FIGS. 2-2 and t5-t6 in FIG. 2-3, when ILr=ILm, the switch elements Q1~Q4 are turned off at the same time under the control of the switch controller 6, such that the third resonance loop LLC3 is defined by the parasitic capacitance Cm2 of the switch element Q2, the parasitic capacitance Cm4 of the switch element Q4, the capacitor Cr, the inductor Lr, and the primary side Tr1 of the transformer 3. However, only the switch elements Q1, Q3 and Q4 may be turned off and the switch element Q2 may be turned on, such that the third resonance loop LLC3 is defined by the switch element Q2, the parasitic capacitance Cm4 of the switch element Q4, the capacitor Cr, the inductor Lr, and the primary side Tr1 of the transformer 3. Also, only the switch elements Q1, Q2 and Q3 may be turned off and the switch element Q4 may be turned on, such that the third resonance loop LLC3 is defined by the parasitic capacitance Cm2 of the switch element Q2, the switch element Q4, the capacitor Cr, the inductor Lr and the primary side Tr1 of the transformer 3.

Figure 3A:
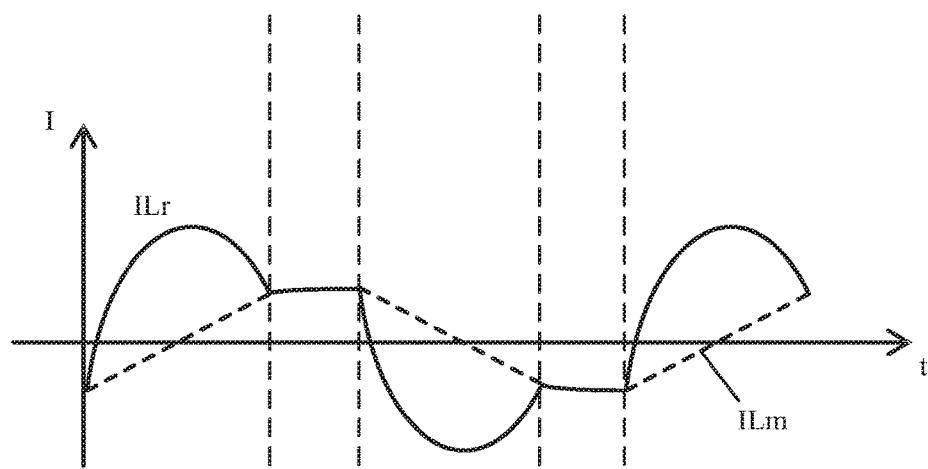
Figure 3B:
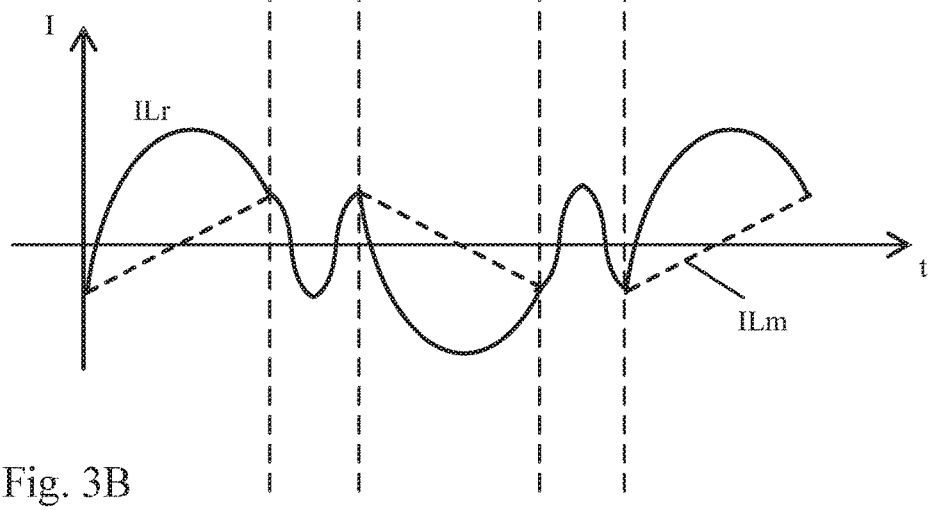
Figure 12:
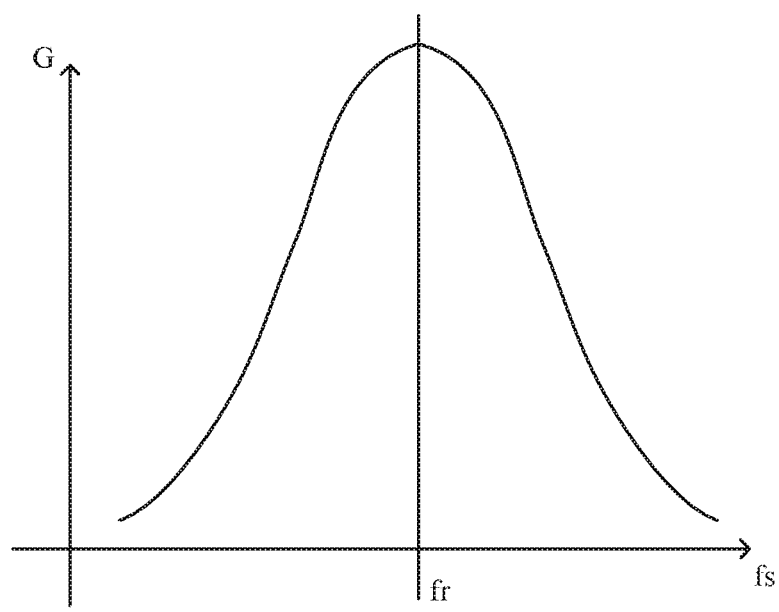
FIG. 12 is a diagram illustrating a relationship between a switching frequency fs of the switch elements Q1~Q4 and a gain G of the DC/DC conversion apparatus 100.
Figure 13:
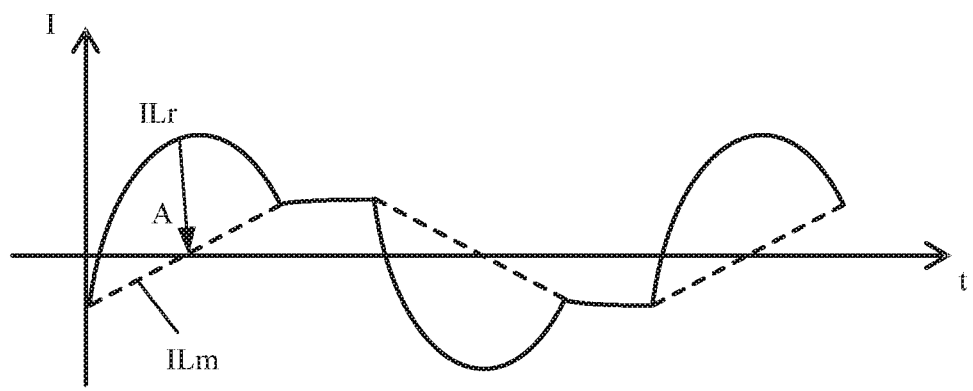
FIG. 13 is a diagram showing a relationship between a current ILm flowing through an inductor Lr and a current ILm flowing through a parasitic inductance Lm.
Figure 14:
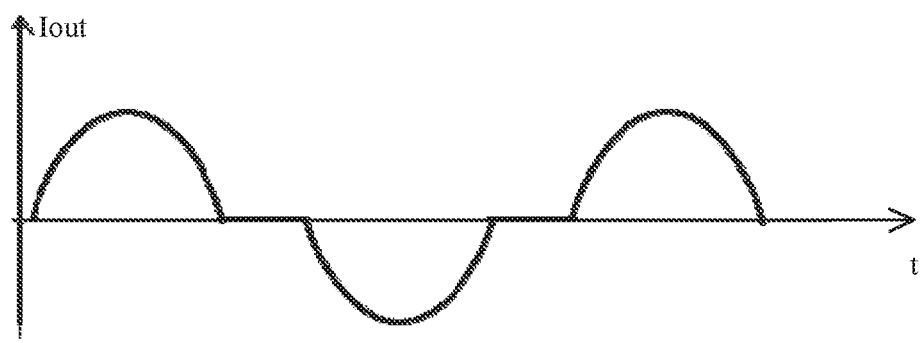
FIG. 14 is a diagram showing an output current Iout being obtained based upon the current ILr and the current ILm in FIG. 13.

FIGS. 3A and 3B are diagrams showing a comparison of a curve of the currents ILr and ILm in FIG. 12 and a curve of the currents ILr and ILm in the first preferred embodiment. Wherein FIG. 3A is the curve of the currents ILr and ILm in the prior art and FIG. 3B is the curve of the currents ILr and ILm in the first preferred embodiment of the present invention, in which solid lines indicate the current ILr and dashed line indicate the current ILm. Effects of the DC/DC conversion apparatus 10 of the first preferred embodiment are set forth below based upon FIG. 3.

As shown in FIG. 3A, in the period of t2-t3, ILr=ILm. Although no energy is transmitted from the primary side Tr1 to the secondary side Tr2 of the transformer 3 because the output current Iout is zero at this moment, the capacitor Cr will continue to be charged by the current ILm (i.e., ILr). Thus, when the direction of the voltage applied to the oscillation circuit 2 is switched, the energy stored in the capacitor Cr will firstly be transmitted to the secondary side Tr2 via the primary side Tr1 of the transformer 2, which makes the outputting of the energy not intermittent. Moreover, since a capacitance value of the capacitor Cr in the oscillation circuit 20 is larger, it is understood according to a resonance frequency formula $f=1/(2\pi\times\sqrt{LC})$ that when the capacitance value of the capacitor Cr is larger, the resonance frequency fr of the first resonance loop LLC1 is smaller and a length of time of a cycle Tr is longer. Thus, as shown in FIG. 3A, since the capacitance value of the capacitor Cr is larger, after ILr=ILm, if the cycle Tr in which the current ILm oscillates freely in the first resonance loop LLC1 (i.e., a length of time in a period of t2-t6) is longer and if the direction of the voltage applied to the oscillation circuit 20 is switched after the current ILm lasts for a cycle Tr, a total output cycle will become longer, which results in a dramatic drop of the gain of the DC/DC conversion apparatus 100.

In contrast, as shown in FIG. 3B, in the period of t2-t3, ILr=ILm. At this moment, a new resonance loop (i.e., the second resonance loop LLC2) is provided. At this moment, the output current Iout is zero such that no energy is transmitted from the primary side Tr to the secondary side Tr2 of the transformer 3. Moreover, in the period of t2-t3, although the capacitor Cr will be charged by ILm (i.e., ILr), forward charging and reverse charging of the capacitor Cr are cancelled out because the length of time of the period of t2-t3 is a complete resonance cycle of the second resonance loop LLC2 and the energy on the capacitor Cr is zero at time t3. Thus, not only no energy is transmitted from the primary side Tr1 to the secondary side Tr2 of the transformer 3 within the period of t2-t3, but also no energy is transmitted from the primary side Tr1 to the secondary side Tr2 of the transformer 3 at time t3. Thus, intermittent outputting of the energy is actually achieved. Moreover, since no energy is outputted in the period of t2-t3, the total output cycle is changed by appropriately adjusting the length of time of the period of t2-t3 (i.e., the resonance frequency F2 of the second resonance loop LLC2) and the gain of the DC/DC conversion apparatus 10 is adjusted.

Moreover, since the capacitance values of the parasitic capacitances Cm2 and Cm4 on the switch elements Q2 and Q4 are smaller, it is understood according to the resonance frequency formula $f=1/(2\pi\times\sqrt{LC})$ that when the capacitance values of the parasitic capacitances Cm2 and Cm4 are smaller, the resonance frequency F2 of the second resonance loop LLC2 is larger and the length of time of its resonance cycle 1/F2 is shorter. Thus, a dramatic drop in the gain of the DC/DC conversion apparatus 100 that the total output cycle becomes longer.

Likewise, for the period of t5-t6 in FIG. 3A and FIG. 3B, the above effects are also able to be achieved.

In summary, in the DC/DC conversion apparatus 10 according to the first preferred embodiment, a new resonance loop (i.e., the second resonance loop LLC2 and/or the third resonance loop LLC3) is provided by controlling turn-on and turn-off of the switch elements Q1~Q4. Thus, the direction of the voltage applied to the oscillation circuit 2 is switched after energy oscillates in the new resonance loop for a time of integer times of the resonance cycle, such that the energy is able to be outputted intermittently and a gain of the DC/DC conversion apparatus is able to decrease when the load is light.

In addition, an effect on the gain of the DC/DC conversion apparatus has two aspects as follows.

In a first aspect, if a ratio of an inductance of the inductor Lr and the parasitic inductance Lm on the primary side Tr1 of the transformer 3 (i.e., Lr/Lm) is larger, a time of the current $I_{LLC}$ flowing through the oscillation circuit 2 returning to zero will be longer and the time of the current $I_{LLC}$ returning to zero increases, which also causes an increase in the time per cycle. Thus, the average output energy within each cycle will be reduced and, as a result, the gain will decrease.

In a second aspect, if a ratio of the inductance of the inductor Lr and a capacitance of the capacitor Cr (i.e., Lr/Cr) is larger, a time of the capacitor Cr being charged within the time of the current $I_{LLC}$ returning to zero increases and a voltage on the capacitor Cr increases, such that when the direction of the voltage applied to the oscillation circuit 2 is switched, a slope of increasing of the current $I_{LLC}$ will increase. Thus, energy inputted onto the primary side Tr1 of the transformer 3 increases and, as a result, the gain will increase.

As described above, in the DC/DC conversion apparatus according to the first preferred embodiment of the present invention, when operating frequencies of the switch elements are invariable, variations of the gain depend on the two aspects of "the time of the current $I_{LLC}$ returning to zero" and "the charging voltage on the capacitor Cr" effect the gain at the same time.

In addition, in the present technical field, if the load is larger, increasing of the time of the current $I_{LLC}$ returning to zero means that more energy will flow out at the time of returning to zero. As a result, the gain will decrease. In contrast, as the load is reduced, the effect of the charging voltage on the capacitor Cr is increased. As a result, the gain will increase.

Therefore, in the first preferred embodiment of the present invention, according to a size of the load, the effect of both "the time of the current $I_{LLC}$ returning to zero" and "the charging voltage on the capacitor Cr" on the gain may be adjusted by appropriately setting the two parameters of "Lr/Lm" and "Lr/Cr". Thus, a size of the gain may be adjusted appropriately according to the size of the load, i.e., increasing the gain or decreasing the gain.

Second Preferred Embodiment

In the first preferred embodiment, when the switch elements Q1 and Q3 are turned off and the switch elements Q2 and Q4 are turned on, switching from the first resonance loop LLC1 to the second resonance loop LLC2 is performed instantly when ILr=ILm and the switch elements Q2 and Q3 are switched to be turned on and the switch elements Q1 and Q4 are switched to be turned off after the second period T2. At this moment, the switch element Q3 is switched from off to on. On the other hand, in the case that the switch elements Q1 and Q3 are turned off and the switch elements Q2 and Q4 are turned on, switching from the first resonance loop LLC1 to the third resonance loop LLC3 is performed instantly when ILr=ILm and the switch elements Q1 and Q4 are switched to be turned on and the switch elements Q2 and Q3 are switched to be turned off after a third period T3. At this moment, the switch element Q1 is switched from off to on. However, switching losses of the switch elements Q3 and Q1 when they are turned on in the above case is not considered in the first preferred embodiment.

Figure 4:
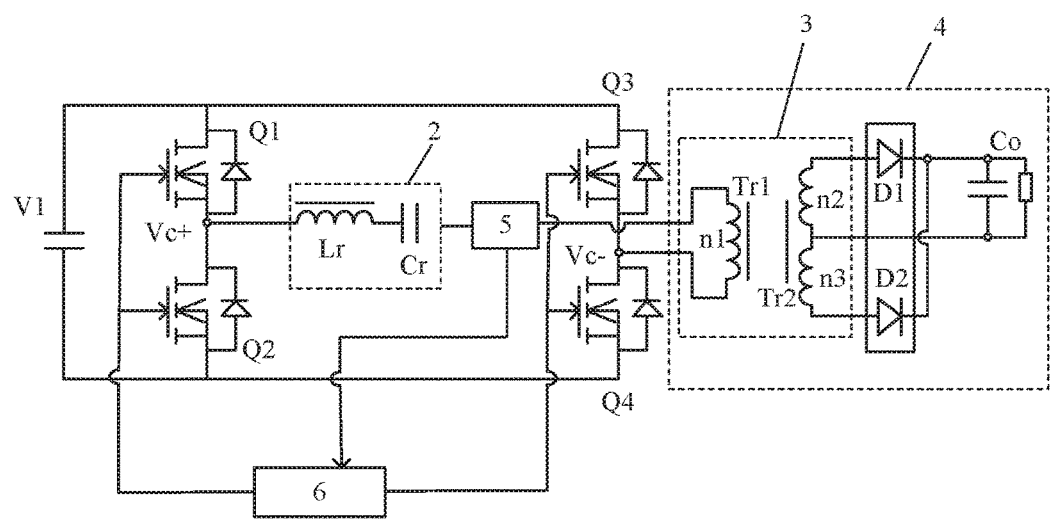
FIG. 4 is a block diagram illustrating a circuit structure of a DC/DC conversion apparatus according to a second preferred embodiment of the present invention.

FIG. 4 shows a circuit structure of a DC/DC conversion apparatus 10 according to a second preferred embodiment of the present invention. A difference between FIG. 4 and FIG. 1 is that individual parasitic capacitances Cm1 and Cm3 on the switch element Q1 and the switch element Q3 are considered in FIG. 4.

Figure 5:
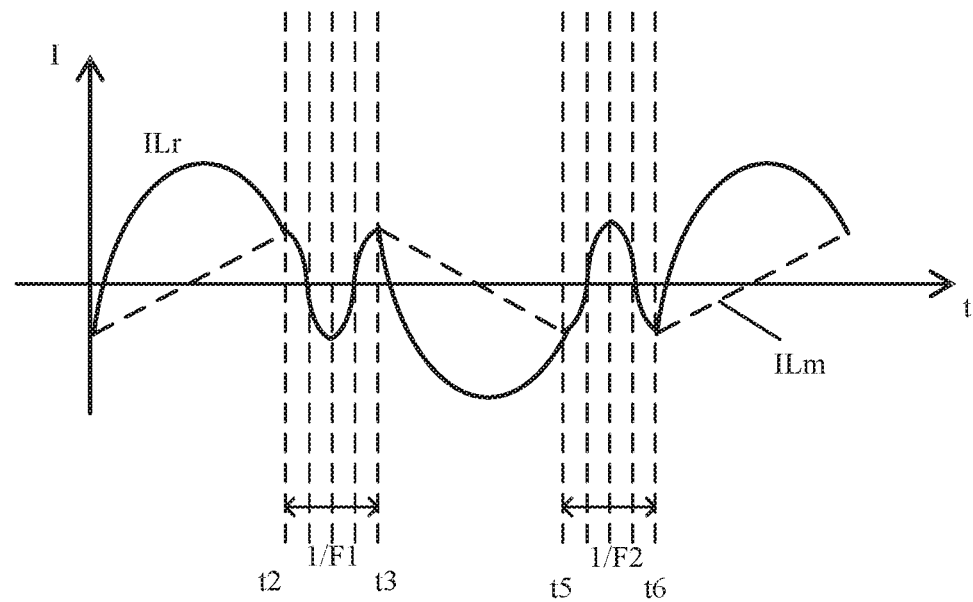
FIG. 5 is an illustration of a relationship between the current ILr and the current ILm within one resonance cycle t2-t3 of a second resonance loop LLC2 and one resonance cycle t5-t6 of a third resonance loop LLC3 as shown in FIG. 3B, wherein a solid line indicates the current ILr and a dashed line indicates the current ILm.

FIG. 5 is an illustration of a relationship between the current ILr and the current ILm within one resonance cycle t2-t3 of the second resonance loop LLC2 and one resonance cycle t5-t6 of the third resonance loop LLC3 as shown in FIG. 3B. A solid line indicates the current ILr and a dashed line indicates the current ILm.

As shown in FIG. 5, the length of time of the period of t2-t3 is equal to 1/F2 and in a period of t2+¼F2 to t2+½F2 and a period of t2+¾F2 to t2+1/F2, the current ILm (i.e., ILr) is a positive value. Moreover, as shown in FIG. 2-3, at the next time t3, the switch element Q2 and the switch element Q3 are turned on and the switch element Q1 and the switch element Q4 are turned off. At this moment, a voltage having a same phase with the DC power supply voltage Vin (i.e., a positive voltage) will be applied to the switch element Q3 being turned on. Thus, if in the period of t2+¼F2 to t2+½F2 or t2+¾F2 to t2+1/F2, not at time t3, the switch element Q2 and the switch element Q3 are turned on and the switch element Q1 and the switch element Q4 are turned off in advance under the control of the switch controller 6, the parasitic capacitance Cm3 of the switch element Q3 will be charged by the current ILm (i.e., ILr) flowing through the inductor Lr in a direction opposite to the direction of the voltage applied to the switch element Q3 when it is turned on at this moment (i.e., a negative direction). Thus, a total voltage applied at two terminals of the switch element Q3 when it is turned on will decrease such that the switching loss of the switch element Q3 when it is turned on is able to be reduced. Furthermore, the total voltage applied at two terminals of the switch element Q3 when it is turned on can even be zero by adjusting the period of t2-t3 (i.e., the above first period T1). At this moment, the switching loss of the switch element Q3 when it is turned on can be zero, i.e., the switch element Q3 achieves a zero voltage switch (ZVS).

Likewise, as shown in FIG. 5, the length of time of the period of t5-t6 is equal to 1/F2 and in the period of t5+¼F2 to t5+½F2 and the period of t5+¾F2 to t5+1/F2, the current ILm (i.e., ILr) is a negative value. Moreover, as shown in FIG. 2-3, at the next time t6, the switch element Q1 and the switch element Q4 are turned on and the switch element Q2 and the switch element Q3 are turned off. At this moment, a voltage having a same phase with the DC power supply voltage Vin (i.e., a positive voltage) will be applied to the switch element Q1 being turned on. Thus, if in the period of t5+¼F2 to t5+½F2 or t5+¾F2 to t5+1/F2, the switch element Q1 and the switch element Q4 are turned on and the switch element Q2 and the switch element Q3 are turned off in advance under the control of the switch controller 6, the parasitic capacitance Cm1 of the switch element Q1 will be charged by the current ILm (i.e., ILr) flowing through the inductor Lr in a direction opposite to the direction of the voltage applied to the switch element Q1 when it is turned on at this moment (i.e., the negative direction). Thus, a total voltage applied at two terminals of the switch element Q1 when it is turned on will decrease such that the switching loss of the switch element Q1 when it is turned on is reduced. Furthermore, the total voltage applied at two terminals of the switch element Q1 when it is turned on can even be zero by adjusting the period of t5-t6 (i.e., the above second period T2). At this moment, the switching loss of the switch element Q1 when it is turned on can be zero, i.e., the switch element Q1 achieves a zero voltage switch (ZVS).

In summary, in the DC/DC conversion apparatus 10 according to the second preferred embodiment of the present invention, if the length of time of the period of t2-t3 in FIG. 5 and FIG. 2-3 is set as the first period T1, the length of time of the period of t5-t6 in FIG. 5 and FIG. 2-3 is set as the second period T2, the resonance frequency of the second resonance loop LLC2 is F2, and the resonance frequency of the third resonance loop LLC3 is F3, the first period T1 satisfies the following formula 3 and the second period T2 satisfies the following formula 4.

$$N/F2 \leq T1 \leq (N+\tfrac{1}{4})/F2 \text{ or } (N+\tfrac{3}{4})/F2 \leq T1 \leq (N+1)/F2,$$
$$(N \geq 0, \text{ and } N \text{ is an integer}); \quad \text{Formula 3:}$$

$$N/F3 \leq T2 \leq (N+\tfrac{1}{4})/F3 \text{ or } (N+\tfrac{3}{4})/F3 \leq T2 \leq (N+1)/F3,$$
$$(N \geq 0, \text{ and } N \text{ is an integer}). \quad \text{Formula 4:}$$

Likewise, formula 3 is also applicable to the period of t2-t3 in FIG. 2-1 in the first preferred embodiment (i.e., the first period T1), and formula 4 is also applicable to the period t4-t5 in FIG. 2-2 in the first preferred embodiment (i.e., the second period T2).

Therefore, according to the second preferred embodiment of the present invention, a direction of the current ILr at the end of the second resonance loop LLC2 and/or the third resonance loop LLC3 is the same as that of the current that causes a turn-on voltage of the switch element Q3 and/or the switch element Q1 to be turned on next become smaller under the control of the switch controller 6. Thus, the switching loss of the switch element Q3 and/or the switch element Q1 is reduced.

Furthermore, in order to enable the switch element Q3 and/or the switch element Q1 to achieve the zero voltage switch (ZVS), as shown in FIG. 4, a detector 5 is provided on the primary side Tr1 of the transformer 3, the detector 5 being used to detect the excitation current ILm on the primary side Tr1 of the transformer 3. When the second resonance loop LLC2 is turned on, within the period of $N/F2 \leq T1 \leq (N+\tfrac{1}{4})/F2$ or $(N+\tfrac{3}{4})/F2 \leq T1 \leq (N+1)/F2$, the time in which the excitation current ILm being detected is greater than zero and less than or equal to a first threshold is used as the above first period T1. On the other hand, when the third resonance loop LLC3 is turned on, within a period of $N/F3 \leq T2 \leq (N+\tfrac{1}{4})/F3$ or $(N+\tfrac{3}{4})/F3 \leq T2 \leq (N+1)/F3$, a time in which the excitation current ILm is detected is equal or substantially equal to a second threshold is used as the above second period T2. The first threshold refers to a current value that makes the turn-on voltage of the switch element Q3 to be turned on when the direction of the voltage applied to the oscillation circuit 2 is switched to the negative direction (i.e., the switch elements Q2 and Q3 are turned on and the switch elements Q1 and Q4 are turned off) be equal or substantially equal to zero, and the second threshold refers to a current value that makes the turn-on voltage of the switch element Q1 to be turned on when the direction of the voltage applied to the oscillation circuit 2 is switched to a positive direction (i.e., the switch elements Q1 and Q4 are turned on and the switch elements Q2 and Q3 are turned off) be equal or substantially equal to zero.

Therefore, according to the second preferred embodiment, not only the switching loss of the switch element Q3 and/or the switch element Q1 is/are able to be reduced, but also the switch element Q3 and/or the switch element Q1 is able to achieve the zero voltage switch (ZVS).

Third Preferred Embodiment

According to the first preferred embodiment and the second preferred embodiment of the present invention, when the switch elements Q1 and Q3 are turned off and the switch elements Q2 and Q4 are turned on, switching from the first resonance loop LLC1 to the second resonance loop LLC2 is performed instantaneously when ILr=ILm and the switch elements Q2 and Q3 are switched to be turned on and the switch elements Q1 and Q4 are switched to be turned off after the first period T1. At this moment, the switch element Q3 is switched from off to on. On the other hand, when the switch elements Q1 and Q3 are turned off and the switch elements Q2 and Q4 are turned on, switching from the first resonance loop LLC1 to the third resonance loop LLC3 is performed instantaneously when ILr=ILm and the switch elements Q1 and Q4 are switched to be turned on and the switch elements Q2 and Q3 are switched to be turned off after the second period T2. In other words, in the DC/DC conversion apparatus 10 of the first preferred embodiment and the second preferred embodiment, switching from the first resonance loop LLC1 to the second resonance loop LLC2 or to the third resonance loop LLC3 is performed instantaneously when ILr=ILm.

Figure 6:
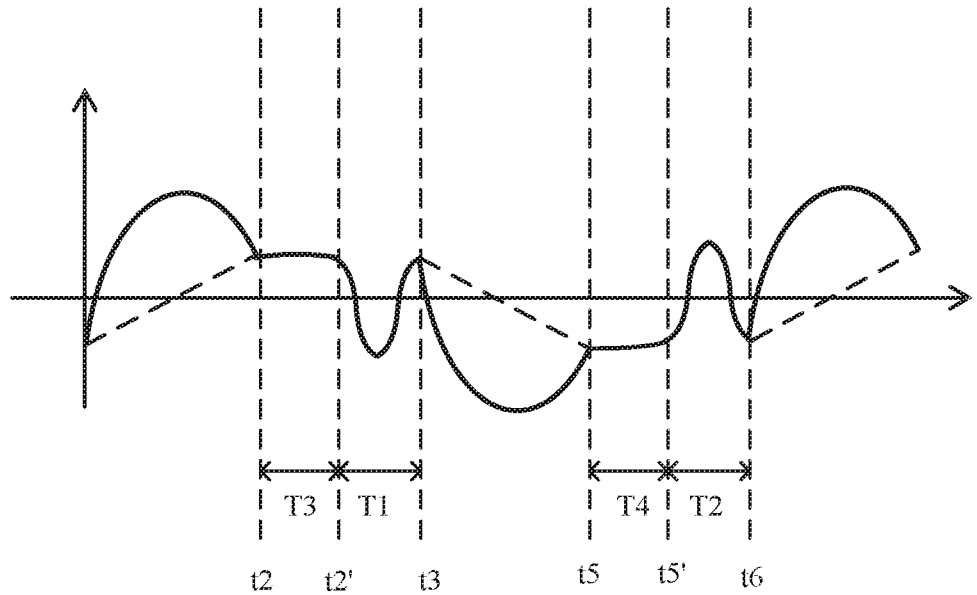
FIG. 6 is an illustration of a relationship between the current ILr and the current ILm within one resonance cycle t2-t3 of a second resonance loop LLC2 and one resonance cycle t5-t6 of a third resonance loop LLC3 as shown in FIG. 3B, wherein a solid line indicates the current ILr and a dashed line indicates the current ILm.
Figure 7:
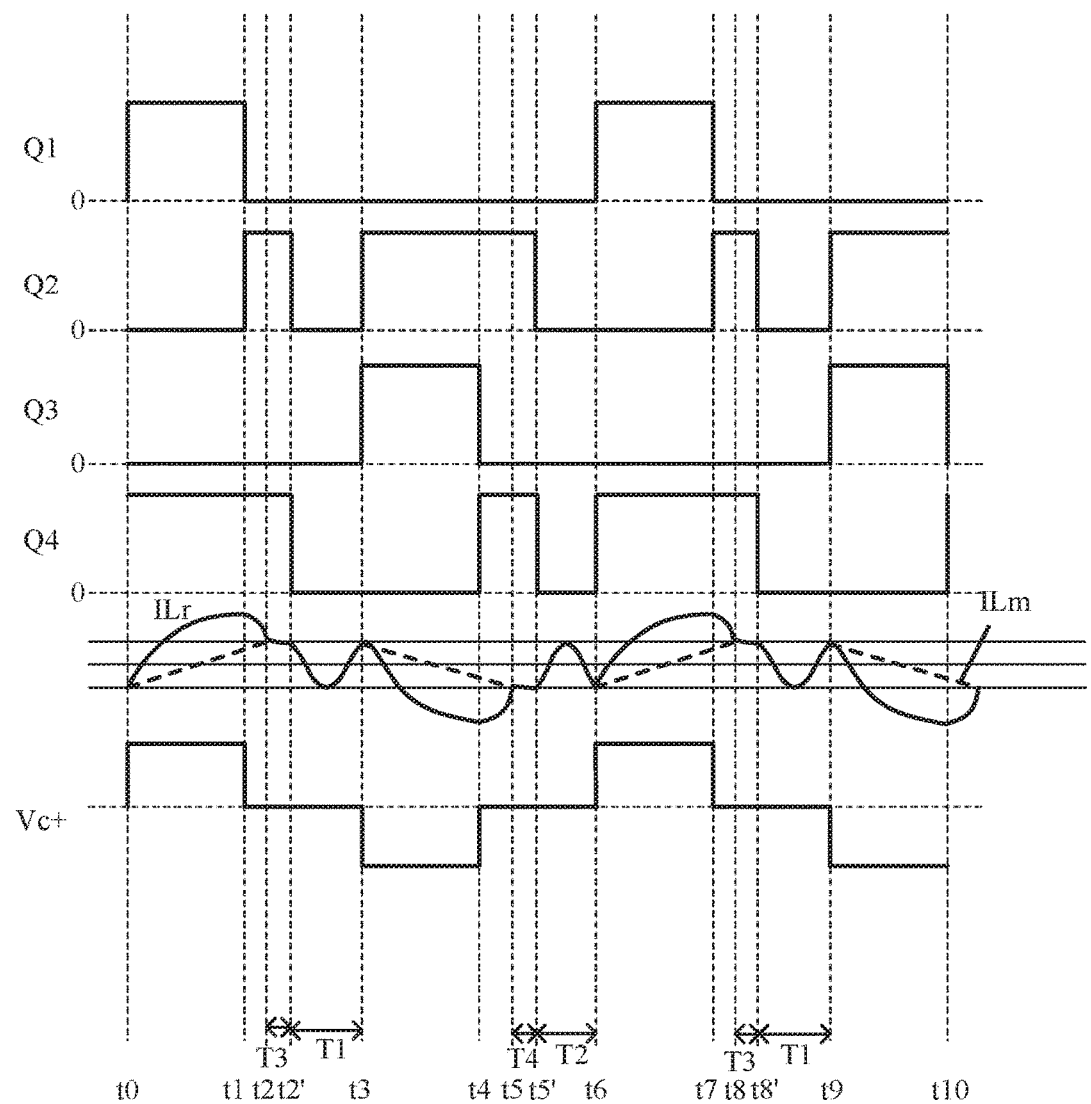
FIG. 7 is a timing diagram of turn-on and turn-off of switch elements Q1~Q4 corresponding to FIG. 6.

FIG. 6 is an illustration of a relationship between the current ILr and the current ILm within one resonance cycle t2-t3 of the second resonance loop LLC2 and one resonance cycle t5-t6 of the third resonance loop LLC3 as shown in FIG. 3B. A solid line indicates the current ILr and a dashed line indicates the current ILm. FIG. 7 is a timing diagram of turn-on and turn-off of the switch elements Q1~Q4 corresponding to FIG. 6.

As shown in FIG. 6, a time t2' is added in the period of t2-t3, a length of time of a period of t2-t2' is T3, and a length of time of a period of t2'-t3 is T1. In other words, a third period T3 is added within the period of t2-t3. Moreover, within the third period T3, the current ILr flowing through the inductor Lr remain equal or substantially equal to the excitation current ILm on the primary side Tr1 of the transformer 3, i.e., ILr=ILm. Thus, as shown in FIG. 7, at time t2, the switch elements Q2 and Q4 continue to be turned on and the switch elements Q1 and Q3 continue to be turned off, i.e., the first resonance loop LLC1 is turned on. After the third period T3, at least one of the switch elements Q1 and Q3 and the switch elements Q2 and Q4 is turned off to define the second resonance loop LLC2.

Likewise, as shown in FIG. 6, a time t5' is added in the period of t5-t6, a length of time of a period of t5-t5' is T4, and a length of time of a period of t5'-t6 is T2. In other words, a fourth period T4 is added within the period of t5-t6. Moreover, within the above fourth period T4, the current ILr flowing through the inductor Lr remains equal or substantially equal to the excitation current ILm on the primary side Tr1 of the transformer 3, i.e., ILr=ILm. Thus, as shown in FIG. 7, at time t5, the switch elements Q2 and Q4 continue to be turned on and the switch elements Q1 and Q3 continue to be turned off, i.e., the first resonance loop LLC1 is turned on. After the fourth period T4, at least one of the switch elements Q1 and Q3 and the switch elements Q2 and Q4 is turned off to define the third resonance loop LLC3.

In summary, in the DC/DC conversion apparatus 10 according to the third preferred embodiment of the present invention, if the length of time of the period of t2-t2' in FIG. 6 is set as the third period T3, the length of time of the period of t5-t5' in FIG. 6 is set as the fourth period T4 and the resonance frequency of the first resonance loop LLC1 is F1, the third period T3 and the fourth period T4 satisfy the following formula 5 and formula 6, respectively.

$$0 \leq T3 < 1/F1; \quad \text{Formula 5:}$$

$$0 \leq T4 < 1/F1. \quad \text{Formula 6:}$$

In the DC/DC conversion apparatus 10 according to the third preferred embodiment of the present invention, since the current ILm (i.e., ILr) oscillates in the first resonance loop LLC1 for the third period T3 and/or the fourth period T4 when ILr=ILm, a total output energy of the DC/DC conversion apparatus 10 may be adjusted according to a length of time of the third period T3 and/or the fourth period T4, such that the gain of the DC/DC conversion apparatus 10 may vary consecutively.

Fourth Preferred Embodiment

Figure 8:
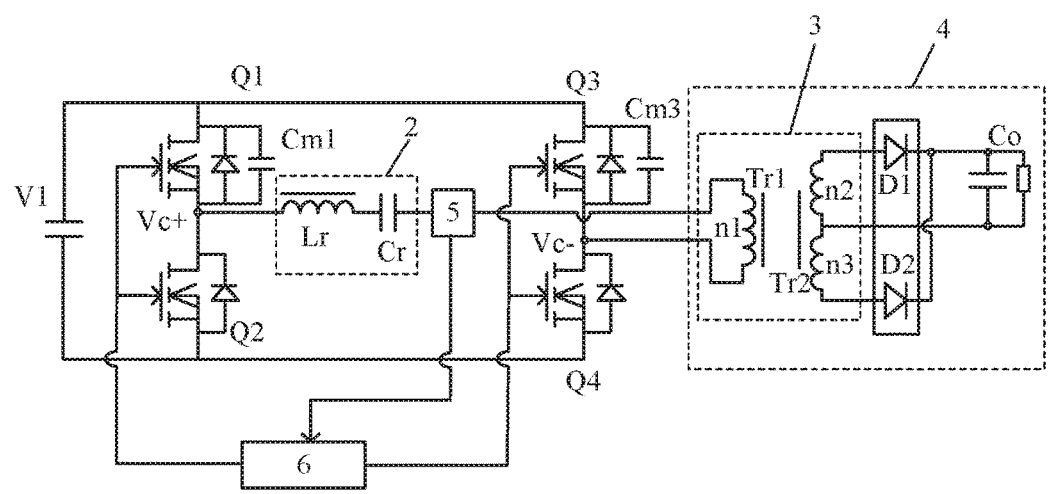
FIG. 8 is a diagram of a circuit structure of a DC/DC conversion apparatus 10 according to a third preferred embodiment of the present invention.

FIG. 8 is a diagram of a circuit structure of a DC/DC conversion apparatus 10 according to a fourth preferred embodiment of the present invention. A difference between the DC/DC conversion apparatus 10 of the fourth preferred embodiment and the DC/DC conversion apparatuses 10 of the first to third preferred embodiments is that non-ignorable parasitic diodes Dm1 and Dm3 are present at two terminals of the switch elements Q1 and Q3 respectively. However, in the DC/DC conversion apparatuses of the first to third preferred embodiments, when there are non-ignorable parasitic diodes Dm1 and Dm3, it is not considered that the excitation current ILm on the primary side Tr1 of the transformer 3 is larger or the parasitic capacitances Cm2 and Cm4 of the switch elements Q2 and Q4 are smaller.

Figure 9:
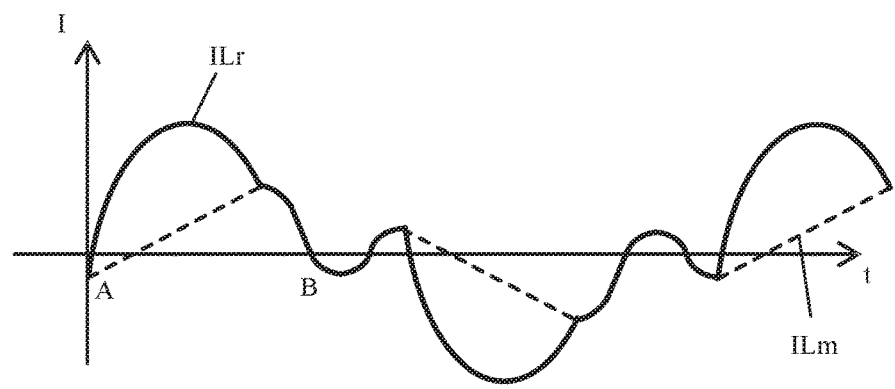
FIG. 9 is a curve of currents ILr and ILm in the DC/DC conversion apparatus 10 according to a fourth preferred embodiment of the present invention.
Figure 10:
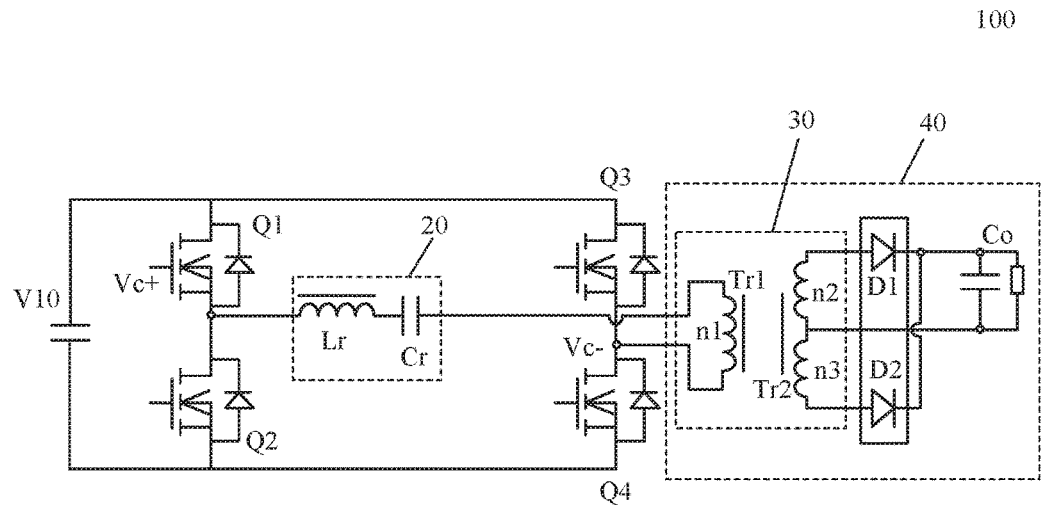
FIG. 10 is a block diagram illustrating a circuit structure of a DC/DC conversion apparatus 100 that includes a LLC full-bridge circuit in the prior art.
Figure 11:
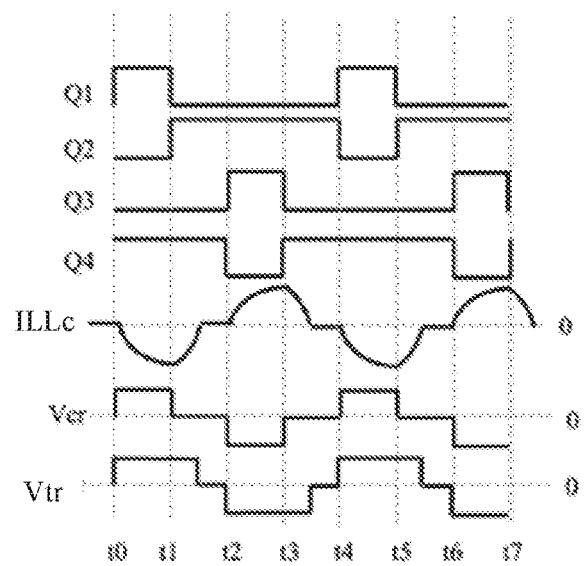
FIG. 11 is a diagram illustrating relationships between times at which various switch elements Q1~Q4 are turned on/off, a current $I_{LLC}$ flowing through an oscillation circuit 20, and a voltage between a high potential side terminal Vc+ and a low potential side terminal Vc− of an oscillation circuit 20 in the prior art.

FIG. 9 is a curve of the currents ILr and ILm in the DC/DC conversion apparatus 10 in the fourth preferred embodiment. As shown in FIG. 8, when ILm is too large or the parasitic capacitances Cm2 and Cm4 of the switch elements Q2 and Q4 are smaller, energy on the parasitic inductance Lm continues to be supplied to the parasitic capacitances Cm2 and Cm4, which will cause voltages on the parasitic capacitances Cm2 and Cm4 to be greater than the power supply voltage Vin. At this moment, the parasitic diodes Dm1 and Dm3 on the switch elements Q1 and Q3 are turned on, which is equivalent to that the DC power supply voltage Vin of the DC voltage source 1 being directly applied to the oscillation circuit 2. At this moment, the excitation current ILm continues to decrease until zero, the parasitic diodes Dm1 and Dm3 will not be turned on, and the excitation current ILm starts to oscillate reversely. Since a period in which the DC power supply voltage Vin is directly applied to the oscillation circuit 2 due to turn-on of the parasitic diode Dm3 on the switch element Q3 is added in the period of t2-t3 in which the second resonance loop LLC2 is provided, which results in a loss of the excitation current ILr in the oscillation circuit 2, formula 1 is not satisfied in the period of t2-t3. Similarly, since a period in which the DC power supply voltage Vin is directly applied to the oscillation circuit 2 due to turn-on of the parasitic diode Dm1 on the switch element Q1 is added in the period of t5-t6 in which the third resonance loop LLC3 is provided, which results in a loss of the excitation current ILr in the oscillation circuit 2, the above formula 2 is not satisfied in the period of t5-t6.

As described above, in the fourth preferred embodiment, as shown in FIG. 8, the detector 5 is provided on the primary side Tr1 of the transformer 3, and the detector 5 is used to detect the excitation current ILm on the primary side Tr1 of the transformer 3. When the excitation current ILm being detected is larger or the parasitic capacitance of the switch element Q2 and/or the switch element Q4 is smaller, in the first resonance loop LLC1, when ILr=ILm, the switch elements Q2 and Q4 are turned off at the same time to define the second resonance loop LLC2. At this moment, according to a current value or variation ratio of the excitation current ILm or a size of the voltage on the switch element Q3, the switch controller 6 computes and controls a time of switching from the second resonance loop LLC2 to turn-on of the third switch element Q3, such that the period in which the DC power supply voltage Vin is directly applied to the oscillation circuit 2 due to turn-on of the parasitic diode Dm3 on the switch element Q3 will not be generated.

Similarly, in when the excitation current ILm being detected is larger or the parasitic capacitance of the switch element Q2 and/or the switch element Q4 is smaller, in the first resonance loop LLC1, when ILr=ILm, the switch elements Q2 and Q4 are turned off at the same time to define the third resonance loop LLC3. At this moment, according to the current value or variation ratio of the excitation current ILm or a size of the voltage on the switch element Q1, the switch controller 6 computes and controls a time of switching from the third resonance loop LLC3 to turn-on of the switch element Q1, such that the period in which the DC power supply voltage Vin is directly applied to the oscillation circuit 2 due to turn-on of the parasitic diode Dm1 on the switch element Q1 will not be generated.

In the DC/DC conversion apparatus 10 according to the fourth preferred embodiment, in situation in which the second resonance loop LLC2 and/or the third resonance loop LLC3 cannot satisfy formula 1 and/or formula 2 because the excitation current ILm is larger or the parasitic capacitance of the switch element Q2 and/or the switch element Q4 is smaller is prevented.

Fifth Preferred Embodiment

As described above, in the first to fourth preferred embodiments of the present invention, the rectification diodes D1 and D2 are preferably provided in the transformation circuit 4 of the DC/DC conversion unit 10. However, in the present field, since a loss will be generated when a rectification diode is turned on and turned off and a voltage drop of the rectification diode generally available in the market is usually about 0.7 V, for example, the gain of the DC/DC conversion apparatus 10 according to a preferred embodiment of the present invention will decrease. Since the voltage drop of a rectification switch is less than that of the rectification diode and a voltage drop of the rectification switch generally available in the market is usually about 0.1 V, the loss is able to be reduced with the rectification switch. According to this, the rectification diode may also be replaced by the rectification switch to achieve the requirement of reducing the loss.

However, if a LLC full-bridge switching configuration in which duty cycles of the switches are each about 50% is utilized, since after the time of the DC voltage source V1 being applied to the oscillation circuit 2 in the first direction has passed, the DC voltage source V1 will instantly be applied to the oscillation circuit 2 in the second direction under the control of the switch controller 6. At this moment, with reference to time period A-B in FIG. 9, although the direction of the voltage Vc+− will vary within this time period, a direction of the current $I_{LLC}$ must be delayed to switch after time point B, i.e., a direction of a current in the oscillation circuit 2 must be switched after a period of time. Thus, in this case, if the diode is replaced by the rectification switch, only a current on the rectification switch may be detected or a delay time after the switch element Q1 to the switch element Q4 are turned on/off may be estimated, and then, the rectification diode is turned on, which will result in a control method that is more complex and will increase the cost. With respect to this, synchronous rectification switches Q5 and Q6 may be synchronously turned on respectively when the switch element Q1 and the switch element Q3 are turned on and synchronously turned off respectively when the switch element Q4 and the switch element Q2 are turned off. Since in the first to fourth preferred embodiments of the present invention, $I_{LLC}$ has been zero at this moment, the synchronous rectification switches Q5 and Q6 may be controlled in synchronization with Q1~Q4. The result is that the control becomes very simple and accurate.

Various variations may be made to preferred embodiments of the present invention without departing from the wide spirit and scope of the present invention. In addition, the above preferred embodiments are only presented as examples of the present invention, but do not limit or restrict the scope of the present invention. In other words, the scope of the present invention is defined by the claims, but not defined by the above preferred embodiments. Moreover, various variations implemented within the scope of the claims and the scope of their equivalences may also be considered within the scope of the present invention.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A DC/DC conversion apparatus, comprising:
a DC voltage source that outputs a DC power supply voltage;
an oscillation circuit electrically connected to the DC voltage source;
a plurality of switch elements;
a switch controller that connects or disconnects an electrical connection between the DC voltage source and the oscillation circuit by switching turn-on and turn-off of the plurality of switch elements, and switches a direction of a voltage applied to the oscillation circuit between a first direction and a second direction; and
a transformation circuit that outputs a current generated in the oscillation circuit and converts the current into a DC current; wherein
an inductor is provided in the oscillation circuit, a transformer is provided in the transformation circuit, and a primary side of the transformer is connected in series with the oscillation circuit;
before a direction of a voltage applied to the oscillation circuit is switched from the first direction to the second direction, the switch controller disconnects the electrical connection between the oscillation circuit and the DC voltage source and a first resonance loop is defined by a portion of the plurality of switch elements and the oscillation circuit, when a current flowing through the inductor is equal or substantially equal to an excitation current on the primary side of the transformer in the first resonance loop, at least one switch element in the first resonance loop is turned off to define a second resonance loop, after a current in the second resonance loop oscillates passing through a first period, the electrical connection between the oscillation circuit and the DC voltage source is connected and the direction of the voltage applied to the oscillation circuit is switched to the second direction.

2. The DC/DC conversion apparatus according to claim 1, wherein a resonance frequency of the second resonance loop is F2, the first period is T1, and the following formula is satisfied:

$T1=M/F2$, wherein $M$ is an integer that is greater than or equal to 1.

3. The DC/DC conversion apparatus according to claim 1, wherein a resonance frequency of the second resonance loop is F2, the first period is T1, and the following formula is satisfied:

$N/F2 \leq T1 \leq (N+\frac{1}{4})/F2$ or $(N+\frac{3}{4})/F2 \leq T1 \leq (N+1)/F2$,
wherein $N$ is an integer that is greater than or equal to 0.

4. The DC/DC conversion apparatus according to claim 3, wherein
a detector is provided on the primary side of the transformer and detects an excitation current on the primary side of the transformer; and
in the second resonance loop, within a period of $N/F2 \leq T1 \leq (N+\frac{1}{4})/F2$ or $(N+\frac{3}{4})/F2 \leq T1 \leq (N+1)/F2$, a time in which the excitation current being detected is greater than zero and less than or equal to a first threshold is the first period T1.

5. The DC/DC conversion apparatus according to claim 4, wherein the first threshold is a current value that causes a turn-on voltage of a switch element to be turned on when the direction of the voltage applied to the oscillation circuit is switched to the second direction be equal or substantially to zero.

6. The DC/DC conversion apparatus according to claim 1, wherein after the current flowing through the inductor is equal or substantially equal to the excitation current on the primary side of the transformer in the first resonance loop, when the first resonance loop remains invariable and after passing through a third period, the second resonance loop is provided.

7. The DC/DC conversion apparatus according to claim 6, wherein a resonance frequency of the first resonance loop is F1, the third period is T3, and the following formula is satisfied:

$0 \leq T3 < 1/F1$.

8. The DC/DC conversion apparatus according to claim 1, wherein before the direction of the voltage applied to the oscillation circuit is switched from the second direction to the first direction, the switch controller disconnects the electrical connection between the oscillation circuit and the DC voltage source and the first resonance loop is defined by a portion of the plurality of switch elements and the oscillation circuit, when the current flowing through the inductor is equal or substantially equal to the excitation current on the primary side of the transformer in the first resonance loop, at least one switch element in the first resonance loop is turned off to define a third resonance loop, after a current in the third resonance loop oscillates passing through a second period, the electrical connection between the oscillation circuit and the DC voltage source is connected and the direction of the voltage applied to the oscillation circuit is switched to the second direction.

9. The DC/DC conversion apparatus according to claim 8, wherein a resonance frequency of the third resonance loop is F3, the second period is T2, and the following formula is satisfied:

$T2=M/F3$, wherein $M$ is an integer that is greater than or equal to 1.

10. The DC/DC conversion apparatus according to claim 8, wherein a resonance frequency of the third resonance loop is F3, the second period is T2, and the following formula is satisfied:

$N/F3 \leq T2 \leq (N+\frac{1}{4})/F3$ or $(N+\frac{3}{4})/F3 \leq T2 \leq (N+1)/F3$,
wherein $N$ is an integer that is greater than or equal to 0.

11. The DC/DC conversion apparatus according to claim 10, wherein
a detector is provided on the primary side of the transformer and detects an excitation current on the primary side of the transformer;
in the third resonance loop, within a period of N/F3≤T2≤ (N+¼)/F3 or (N+¾)/F3≤T2≤(N+1)/F3, a time in which the excitation current being detected is greater than zero and less than or equal to a second threshold is the second period T2.

12. The DC/DC conversion apparatus according to claim 11, wherein the second threshold is a current value that causes a turn-on voltage of a switch element to be turned on when the direction of the voltage applied to the oscillation circuit is switched to the first direction be equal or substantially equal to zero.

13. The DC/DC conversion apparatus according to claim 12, wherein after the current flowing through the inductor is equal or substantially equal to the excitation current on the primary side of the transformer in the first resonance loop, when the first resonance loop remains invariable and after passing through a fourth period, the second resonance loop is provided.

14. The DC/DC conversion apparatus according to claim 13, wherein a resonance frequency of the first resonance loop is F1, the fourth period is T4, and the following formula is satisfied:

$$0 \leq T4 < 1/F1.$$

15. The DC/DC conversion apparatus according to claim 1, wherein
the plurality of switch elements include a first switch element, a second switch element, a third switch element, and a fourth switch element, in which:
a connection point between the first switch element and the third switch element is connected with a positive side of the DC voltage source;
a connection point between the second switch element and the fourth switch element is connected with a negative side of the DC voltage source;
a connection point between the first switch element and the second switch element is connected with one terminal of the oscillation circuit; and
a connection point between the third switch element and the fourth switch element is connected with the other terminal of the oscillation circuit.

16. The DC/DC conversion apparatus according to claim 15, wherein the second switch element and the fourth switch element are turned on and the first switch element and the third switch element are turned off, to provide the first resonance loop.

17. The DC/DC conversion apparatus according to claim 16, wherein
when the current flowing through the inductor is equal or substantially equal to the excitation current on the primary side of the transformer in the first resonance loop and the second resonance loop is provided:
if the second switch element is turned off, the second resonance loop includes a parasitic capacitance of the second switch element and the fourth switch element;
if the fourth switch element is turned off, the second resonance loop includes the second switch element and a parasitic capacitance of the fourth switch element;
if the second switch element and the fourth switch element are turned off, the second resonance loop includes a parasitic capacitance of the second switch element and a parasitic capacitance of the fourth switch element.

18. The DC/DC conversion apparatus according to claim 17, wherein if the excitation current being detected is larger than a first predetermined value or the parasitic capacitance of the switch element and/or the switch element is smaller than a second predetermined value, when the current flowing through the inductor is equal or substantially equal to the excitation current on the primary side of the transformer in the first resonance loop, the second switch element and the fourth switch element are turned off at the same time to provide the second resonance loop.

19. The DC/DC conversion apparatus according to claim 18, wherein the switch controller computes and controls a time of switching from the second resonance loop to turn-on of the third switch element according to a current value or variation ratio of the excitation current or a size of a voltage on the third switch element.

20. The DC/DC conversion apparatus according to claim 16, wherein
when the current flowing through the inductor is equal or substantially equal to the excitation current on the primary side of the transformer in the first resonance loop and the third resonance loop is provided:
if the second switch element is turned off, the third resonance loop includes a parasitic capacitance of the second switch element and the fourth switch element;
if the fourth switch element is turned off, the third resonance loop includes the second switch element and a parasitic capacitance of the fourth switch element;
if the second switch element and the fourth switch element are turned off, the third resonance loop includes a parasitic capacitance of the second switch element and a parasitic capacitance of the fourth switch element.

21. The DC/DC conversion apparatus according to claim 20, wherein if the excitation current being detected is larger than a first predetermined value or the parasitic capacitance of the switch element and/or the switch element is smaller than a second predetermined value, when the current flowing through the inductor is equal or substantially equal to the excitation current on the primary side of the transformer in the first resonance loop, the second switch element and the fourth switch element are turned off at the same time to provide the third resonance loop.

22. The DC/DC conversion apparatus according to claim 21, wherein the switch controller computes and controls a time of switching from the third resonance loop to turn-on of the first switch element according to a current value or variation ratio of the excitation current or a size of a voltage on the first switch element.

23. The DC/DC conversion apparatus according to claim 15, wherein a transformer is included in the transformation circuit, synchronous rectification switches are connected at two terminals of a secondary side of the transformer respectively, the synchronous rectification switches are turned on respectively when the first switch element and the third switch element are turned on and off respectively when the fourth switch element and the second switch element are turned off.

* * * * *